US007092670B2

(12) United States Patent
Tanaka et al.

(10) Patent No.: US 7,092,670 B2
(45) Date of Patent: Aug. 15, 2006

(54) METHOD FOR EXCHANGING INFORMATION BETWEEN COMMUNICATION DEVICES PERFORMING WIRELESS COMMUNICATION

(75) Inventors: Makoto Tanaka, Tokyo (JP); Toru Akazawa, Tokyo (JP); Rajesh Kumar Dixit, Tokyo (JP)

(73) Assignee: Sony Computer Entertainment Inc., (JP)

( * ) Notice: Subject to any disclaimer, the term of this patent is extended or adjusted under 35 U.S.C. 154(b) by 408 days.

(21) Appl. No.: 10/056,849

(22) Filed: Jan. 25, 2002

(65) Prior Publication Data

US 2002/0111179 A1 Aug. 15, 2002

(30) Foreign Application Priority Data

Jan. 25, 2001 (JP) ............................ P2001-017689

(51) Int. Cl.
*H04B 3/36* (2006.01)
(52) U.S. Cl. ............................ 455/7; 455/15; 455/517; 455/417; 455/61; 455/62
(58) Field of Classification Search ................ 455/517, 455/417, 7, 15, 41.1, 41.2, 41.3, 518, 519, 455/520; 379/61, 62
See application file for complete search history.

(56) References Cited

U.S. PATENT DOCUMENTS 4,979,205 A * 12/1990 Haraguchi et al. .......... 455/411
5,890,069 A * 3/1999 Evans et al. ................. 455/462
5,909,652 A * 6/1999 Ishikawa et al. ............ 455/558
6,584,080 B1 * 6/2003 Ganz et al. .................. 370/315
6,662,005 B1 * 12/2003 Palvianen ................. 455/414.1
2002/0052214 A1 * 5/2002 Maggenti et al. ........... 455/517

FOREIGN PATENT DOCUMENTS

| JP | 8130771 A | 5/1996 |
|---|---|---|
| JP | 8140141 | * 5/1996 |
| JP | 8140141 A | 5/1996 |

* cited by examiner

*Primary Examiner*—Edan Orgad
*Assistant Examiner*—Angelica M. Perez
(74) *Attorney, Agent, or Firm*—Lerner, David, Littenberg, Krumholz & Mentlik, LLP

(57) ABSTRACT

When a connection is made between a first communication device and a second communication device at a first connector and a second connector, information is generated and exchanged for the purpose of specifying parties to mutual wireless communication. After this information exchange, information is added by a transceiver to data transmitted and received by wireless communication for the purpose of identifying the party to the communication and, by setting the first communication device and the second communication device so that they respond only to data having that data added thereto, one-to-one communication between the first communication device and the second communication device is achieved. One-to-many communication between a first communication device and many second communication devices is also provided.

48 Claims, 22 Drawing Sheets

FIG. 20
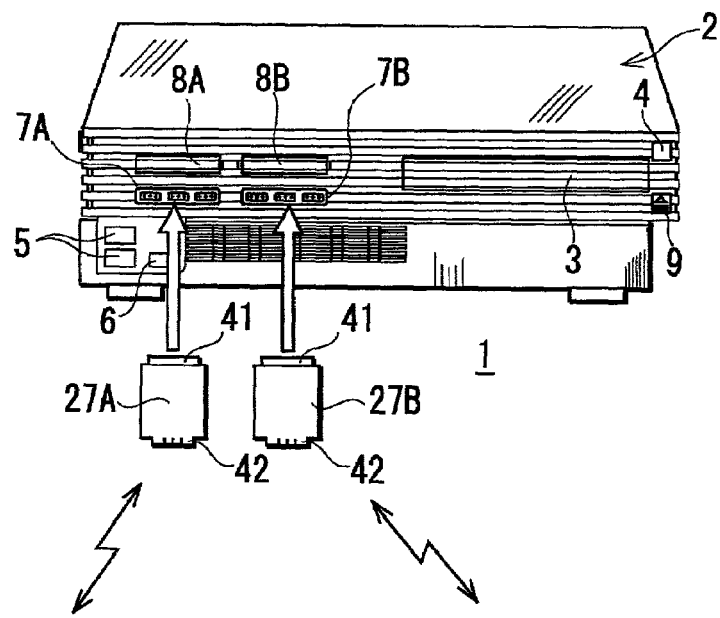
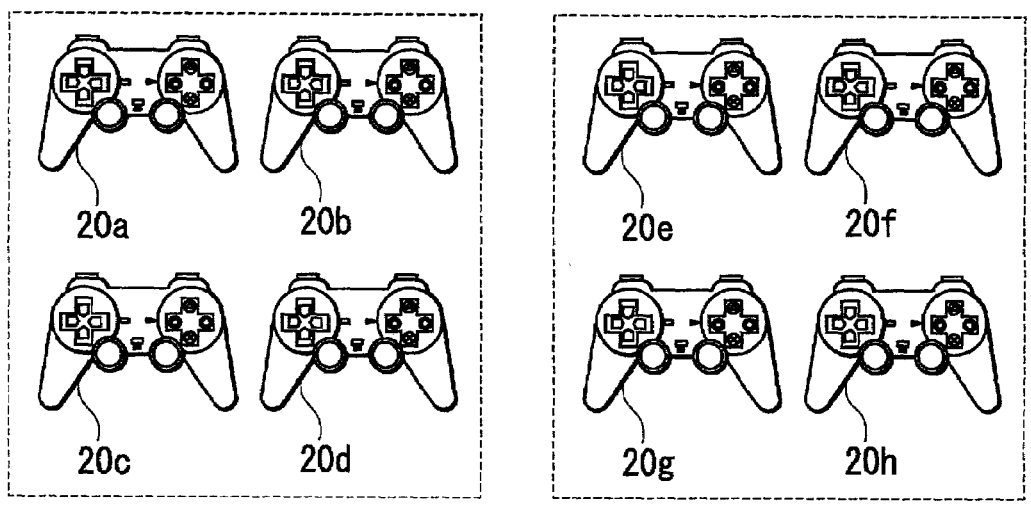

METHOD FOR EXCHANGING INFORMATION BETWEEN COMMUNICATION DEVICES PERFORMING WIRELESS COMMUNICATION

CROSS-REFERENCE TO RELATED APPLICATIONS

This application claims priority from Japanese Patent Application No. 2001-17689 filed on Jan. 25, 2001, the disclosure of which is hereby incorporated by reference herein.

BACKGROUND OF THE INVENTION

The present invention relates to an information exchanging method and an information communication device for exchanging information to mutually specify the device with which wireless communication is performed, to a computer-readable storage medium into which is stored an information exchange processing program for execution by a computer, to a program execution apparatus for executing an information exchange processing program, and to an information exchange processing program for execution by a computer.

In the past, short-range one-to-one wireless communication has been performed using, for example, an infrared or low-power RF signal.

In a case in which a plurality (3 or more) of communication devices exist within a region in which they can perform mutual communication therebetween, in order to perform the above-noted short-range one-to-one communication, the communication devices to perform the one-to-one communication perform wireless communication wherein each communication device mutually specifies the other party to the communication.

More specifically, in the case in which there are a plurality of communication devices having a transceiver transmitting and receiving a signal using an infrared or RF signal, and a main apparatus unit, all of these existing within a region in which it is possible to perform short-range one-to-one communication, when communication is performed, for example, between two communication devices without specification being made of the parties to the communication, another communication device responds to the communication between the intended parties. Thus, in order to perform one-to-one communication between the intended two communication devices, it is necessary for each of the parties to the communication to specify the other party to the communication.

In general, for example, when a first communication device transmits a signal to a second communication device, communication is performed either by adding information to the transmitted signal which specifies the second communication device or by performing transmission under conditions so that only the second communication device responds, and when a second communication device transmits a signal to a first communication device, communication is performed either by adding information to the transmitted signal which specifies the first communication device or by performing transmission under conditions so that only the first communication device responds, the result being the achievement of short-range one-to-one mutual communication between the first communication device and the second communication device, in which the other party to the communication is specified.

As described above, in order to achieve short-range one-to-one communication, the parties to the one-to-one communication must mutually exchange information for the purpose of specifying the other party to the communication.

The exchange of information that specifies the other party to the communication is generally done by wireless communication either together with the transmission and reception of a communication signal, or before the transmission and reception of a communication signal. However, the exchange of information for specifying the other party to the communication using wireless communication is accompanied by many problems with regard to security, and it is difficult to verify whether or not information exchange has been performed normally. In particular, in a case in which the above-noted communication device is, for example, a portable information terminal dealing with important information such as personal information, if the exchange of information for the purpose of specifying the other party to the communication is not performed correctly, and the information terminal is set for communication with an erroneous party, important personal information or the like can be transmitted to and received at the wrong terminal. Additionally, if an encryption method is used when performing exchange of information that specifies the other party to the communication, although the security problems are reduced, additional processing is required, for example, for the purpose of setting an encryption key for encrypting the information specifying the other party to the communication, thereby leading to complexity and an increase in cost.

It can be envisioned that, in place of transmitting and receiving information for specifying the other party to the communication, if a selector switch is provided on each communication device for the purpose of setting the other party to the communication, this selector switch can be used to make selective setting so as to specify the other party to the communication. If the other party to the communication is selectively set using such a selector switch, not only is the above-noted security problem eliminated, but also the selective setting of this switch can be visually viewed, thereby facilitating verification of what setting has been made of the other party to the communication.

In a system, however, in which a selector switch is used to specify the other party to a communication, in a case in which there are several hundred to several thousand possible communication devices with which communication can be performed, a switch enabling accommodation of selective setting of each and every one of these is required, thereby rendering this approach impractical.

SUMMARY OF THE INVENTION

Accordingly, the present invention was made in consideration of the above-described drawbacks in the related art, and is directed to an information exchanging method and an information communication device for exchanging information to mutually specify the device with which wireless communication is performed, to a computer-readable storage medium into which is stored an information exchange processing program for execution by a computer, to a program execution apparatus for executing an information exchange processing program, and to an information exchange processing program for execution by a computer, which, in the case of performing one-to-one communication between communication devices, enables reliable specification of the other party to the communication without a security problem, and without a great increase in cost.

In order to achieve the above-described objects, when connection of a predetermined connection part is verified, the present invention generates information for specifying the other party to the wireless communication, and exchanges information for the purpose of specifying the other party to the communication via the predetermined connection part.

More specifically, in a case in which wireless communication is performed between communication devices, information for specifying the other party to the communication is exchanged with the predetermined connection part in an electrically connected condition, thereby eliminating the need to specify the other party to the communication by wireless exchange, or by specification using a selector switch setting.

BRIEF DESCRIPTION OF THE DRAWING

The above and other features will be better understood from the exemplary embodiments described below, taken together with the drawings, of which:

FIG. 20 is a drawing showing an example of the general configuration in the case in which any one of the fifth to seventh embodiments of the present invention is applied to an entertainment system;

DETAILED DESCRIPTION

Preferred embodiments of the present invention are described in detail below, with references made to relevant accompanying drawings.

First Embodiment

Figure 1:
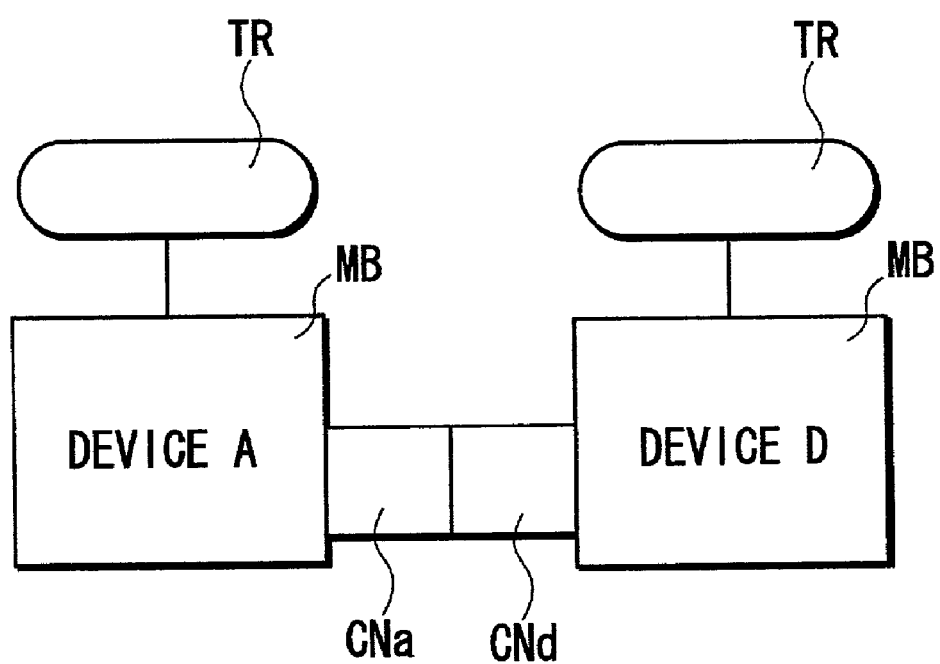
FIG. 1 is a drawing showing an example of the general configuration of a first embodiment of the present invention.

FIG. 1 shows a first embodiment of the present invention, in which, similar to the related art, there are a plurality of communication devices which exist within a region in which short-range communication is possible, wherein, for example, before one-to-one communication between two communication devices, information used for the purpose of mutually identifying the other party to the communication (hereinafter referred to as communication specification information) is exchanged. Each of two communication devices has a transceiver TR and a main apparatus unit MB which transmit and receive a signal using either an infrared signal or an RF signal.

In the case of this embodiment of the present invention, the communication device A shown in FIG. 1 is provided with a connector CNa and the communication device D is provided with a connector CNd. When exchanging communication specification information before one-to-one communication is started, the connectors CNa and CNd are directly electrically connected, so that the exchange of communication specification information is performed by the communication devices A and D via the electrically connected connectors CNa and CNd.

Thus, in this embodiment of the present invention, communication device A sends information specifying itself to the communication device D via the above-noted electrical connection part, and communication device D sends information specifying itself to the communication device A via the above-noted electrical connection part, thereby achieving mutual exchange of communication specification information.

After the above is done, when performing one-to-one communication between the communication device A and the communication device D, communication device A adds the communication specification information obtained from the communication device D to communication information before transmitting the same, and communication device D adds the communication specification information obtained from the communication device A to communication information before transmitting the same. When this is done, each of the communication devices responds only to communication information to which information specifying it has been added. Therefore, the communication device A responds only to communication information from the communication device D, and the communication device D responds only to communication information from the communication device A, so that one-to-one communication is performed between the communication devices A and D.

In the first embodiment of the present invention, configured as noted above, before performing one-to-one communication, a direct electrical connection is made between the communication devices, and communication specification information is exchanged in that condition. According to the first embodiment, therefore, there is no security problem such as arises in the case in which communication specification information is exchanged by wireless communication, information exchange being performed reliably, without the need for making a selective setting using a selector switch for the purpose of specifying the other party.

Example of Communication Specification Information

Forms which can be envisioned as the above-noted communication specification information include, for example, a communication device serial number, a set password shared between the communication devices that are to perform one-to-one communication, a communication frequency to be used only by the communication devices that are to perform one-to-one communication, or communication channel information (each divided channel in the case in which time division multiplexing is done of one frequency band).

The above-noted serial number can be a characteristic identification number for each of the communication devices, or alternatively can be, for example, a telephone number to be used in the case in which the communication devices are portable telephones. The above-noted password can be an arbitrary password set for each of the communication devices, or a password generated as a random number automatically by one of the communication devices. In particular, in the case in which the above-noted serial number is information such as a telephone number which desirably is to be kept secret from other persons, it is desirable that a password generated as a random number be used as the communication specification information. Because random numbers usually do not repeat the same number, however, when using a random number a generated random number is temporarily stored, after which the stored random number is used in performing one-to-one communication.

Communication Specification Information Exchange Processing in the First Embodiment The process of exchanging communication specification information prior to one-to-one communication between communication devices in the first embodiment is described below, with reference being made to FIG. 2, which shows the communication specification information exchange performed by each of the communication devices performing one-to-one communication.

Figure 2:
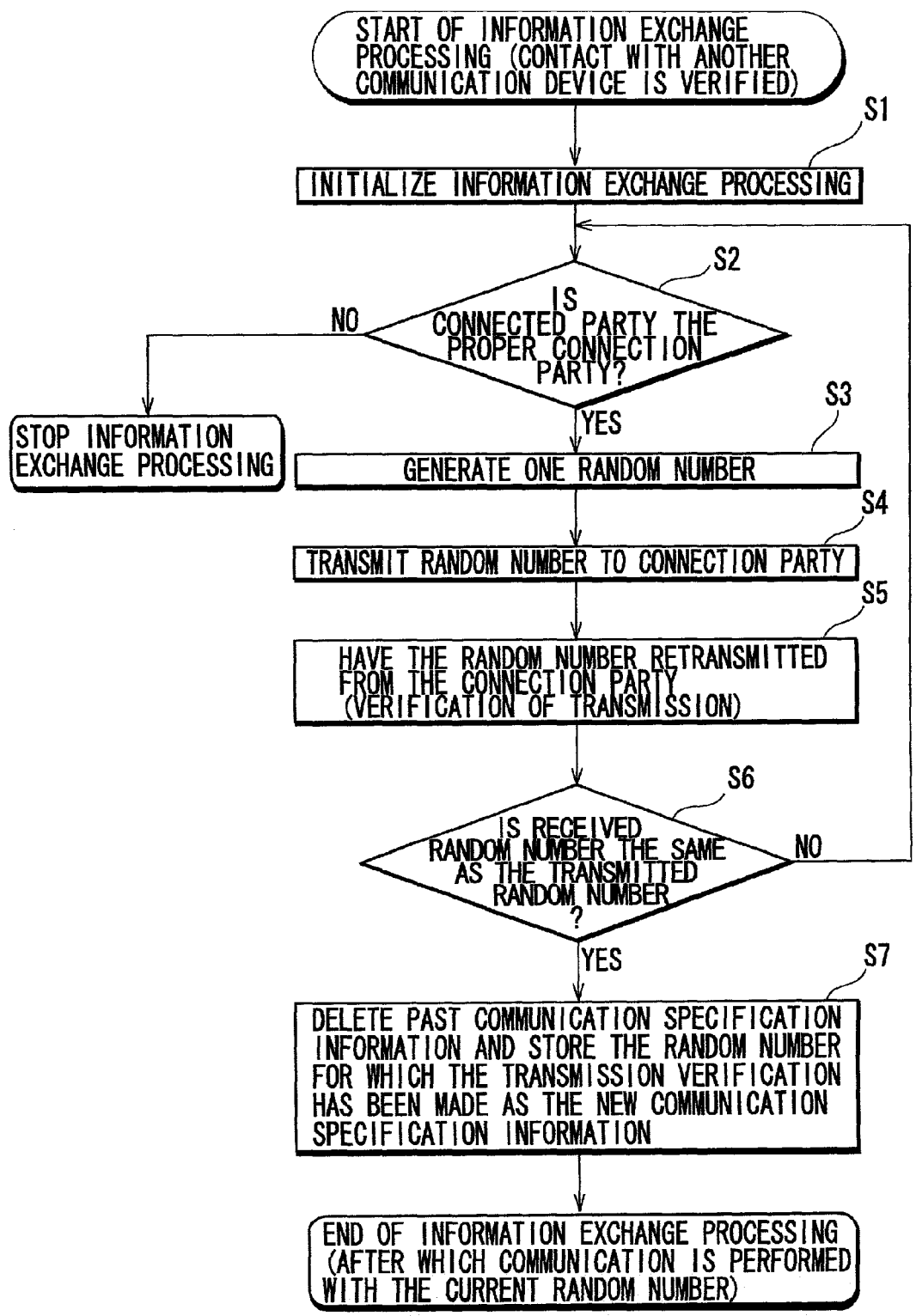
FIG. 2 is a flowchart illustrating a process for exchanging information prior to one-to-one communication between communication devices according to the first embodiment of the present invention.

In FIG. 2, when the first communication device (for example, the communication device A in FIG. 1) verifies that there is a direct electrical connection to the second communication device (for example, the communication device D in FIG. 1), various setting values for the purpose of communication specification information exchange processing are initialized at step S1.

Next, at step S2, the first communication device determines whether the electrically connected second communication device is the correct communication device. That is, an example of the processing at step S2 is a determination of whether the communication format or version is suitable, or whether a proper license has been granted to the communication device, so as to determine whether the second communication device is a proper communication device. In making this determination at step S2, if it is determined that the electrically connected second communication device is not a proper communication device, the processing for information exchange is stopped. If, however, it is determined at step S2 that the second communication device is proper, processing proceeds to step S3.

When the processing proceeds to step S3, the first communication device generates a password, for example by a random number, to be used as the communication specification information, and at step S4 this random number is transmitted to the second communication device, which is the other party to the connection, via the electrically connected part (the connected part between the connectors shown in FIG. 1).

Next, at step S5, the first communication device waits for return of the transmitted random number from the second communication device via the electrically connected part and, if the random number is returned, at step S6 the returned random number (received random number) is checked to see if it is the same as the transmitted random number. At step S6, if the received random number is not the same as the transmitted random number, return is made to the processing of step S2, but if the received random number is the same as the random number that was transmitted, processing proceeds to step S7.

When processing proceeds to step S7, the first communication device deletes the communication specification information used at the time of a previous one-to-one communication, and stores the random number, for example into a buffer, as the new communication specification information.

After the above, the communication specification information exchange is ended, after which one-to-one communication is started using the above-noted random number.

Specifically, when one-to-one communication is performed between the communication devices A and D, the communication devices A and D add the communication specification information (random number), exchanged by the above-noted information exchange, to the communication data before transmission thereof. When this is done, because all of the communication devices respond only to previously exchanged and stored communication specification information, in this example, other communication devices that did not perform the information exchange do not respond to communication data to which the above-noted communication specification information has been added. However, communication devices A and D, which have performed the information exchange beforehand, respond to communication data to which has been added the above-noted communication specification information. By doing this, even if all of the communication devices are within a region in which communication is possible, one-to-one communication will be performed only between communication devices A and D which have previously exchanged the communication specification information.

In the case in which it is desired to maintain the secret nature of the communication data transmitted and received in one-to-one communication, it is possible to encrypt of the communication data using the shared random number as an encryption key, in which case, because other communication devices which are not conducting the one-to-one communication cannot decrypt the code, it is possible to maintain the secrecy of the communication data.

Second Embodiment

In the configuration described as the first embodiment as shown in FIG. 1, the communication devices are provided with connectors for the purpose of communication specification information exchange, a direct connection being made between these connectors. In a case, however, in which the communication devices are large and heavy, making it difficult for them to be moved, a second embodiment of the present invention, shown in FIG. 3, can be envisioned, in which the communication devices and a connector for communication specification information exchange are connected by means of a cable.

Figure 3:
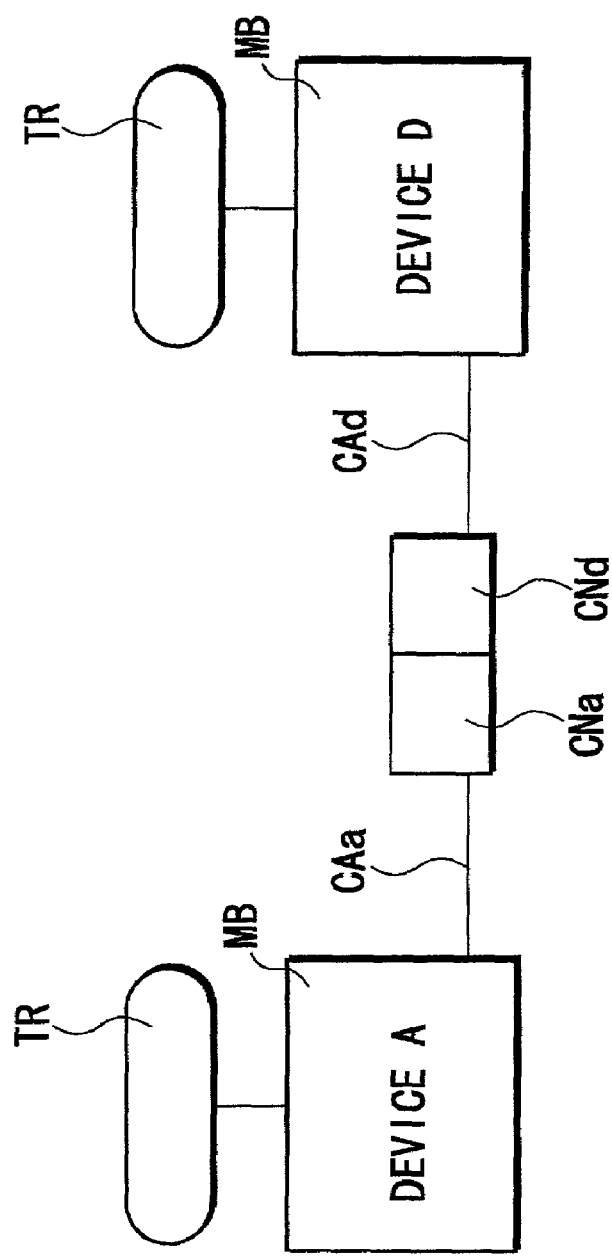
FIG. 3 is a drawing showing an example of the general configuration of a second embodiment of the present invention.

Specifically, as shown in FIG. 3, a connector CNa is connected to the communication device A via a cable CAa, and a connector CNd is connected to the communication device D via a cable CAd. When performing communication specification information exchange prior to performing one-to-one communication, the connectors CNa and CNd are directly electrically connected, so that the communication specification information exchange is performed by the communication devices A and D via cable CAa and connector CNa and by connector CNd and cable CAd.

According to the second embodiment, it is possible to perform mutual exchange of communication specification information without moving the communication devices themselves. Because the processing for exchange of communication specification information and subsequent processing for one-to-one communication are the same as for the first embodiment, these will not be explicitly described herein.

Third Embodiment

The configuration of the first embodiment, shown in FIG. 1, is effective in a case in which the communication devices can be moved, and the configuration of the second embodiment, shown in FIG. 3, is effective in a case in which the distance between the communication devices is somewhat close. In a case, however, in which the communication devices are installed in different rooms, so that that there is somewhat of a distance between the communication devices, it is possible by adopting the configuration of a third embodiment, shown in FIG. 4, to make a connection by means of a predetermined connecting cable between connectors provided on each communication device.

Figure 4:
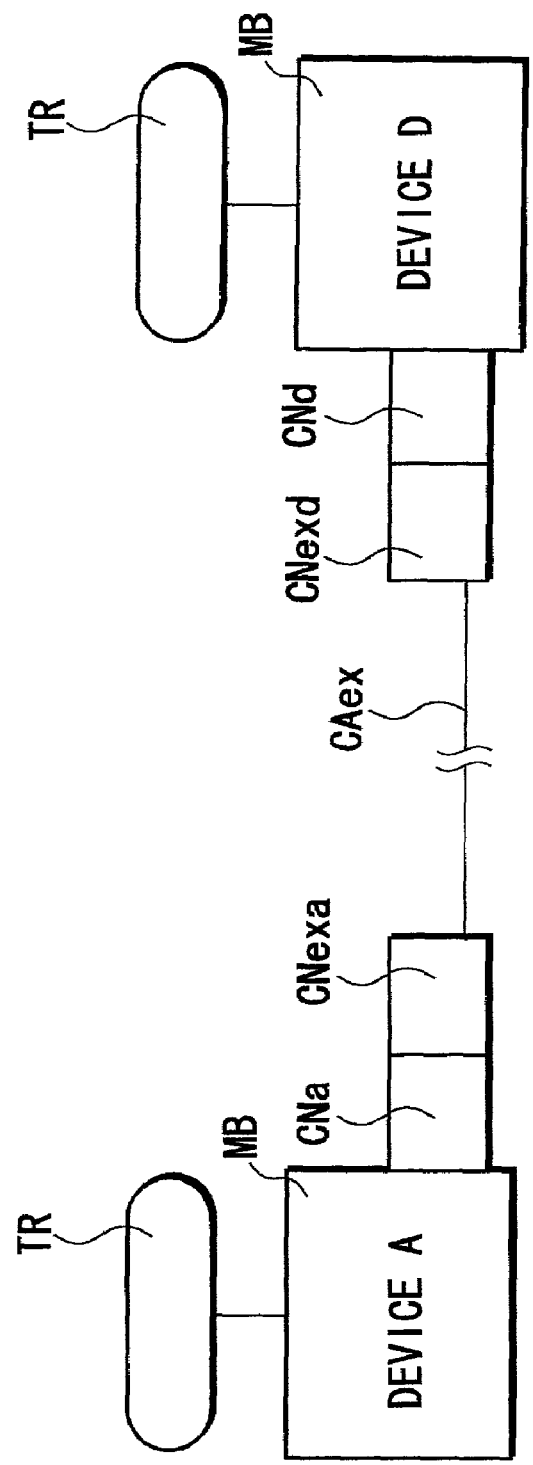
FIG. 4 is a drawing showing an example of the general configuration of a third embodiment of the present invention.

Specifically, as shown in FIG. 4, a prescribed connecting cable CAex is provided on ends thereof with a connector CNexa and a connector CNexd, one connector CNexa being connected to the connector CNa of the communication device A, and the other connector CNexd being connected to the connector CNd of the communication device D. When performing communication specification information exchange prior to one-to-one communication, the predetermined connecting cable CAex is used to make direct electrical connection between the connectors CNa and CNd.

According to the third embodiment, even in the case in which there is somewhat of a distance between the communication devices, it is possible to perform mutual exchange of communication specification information. Because the processing for exchange of communication specification information and subsequent processing for one-to-one communication are the same as for the first embodiment, these will not be explicitly described herein. The communication devices A and D, similar to the case of the second embodiment, can be connected via cable CAa and connector CNa and via connector CNd and cable CAd.

Fourth Embodiment

The above-described first to third embodiments of the present invention are described for the example of exchanging communication specification information when one-to-one communication is to be performed between two communication devices. In contrast to this, as described below with regard to a fourth embodiment of the present invention, it is possible in a system in which one-to-many communication is performed between a plurality of (3 or more) communication devices, to apply the present invention in the exchange of communication specification information.

Figure 5:
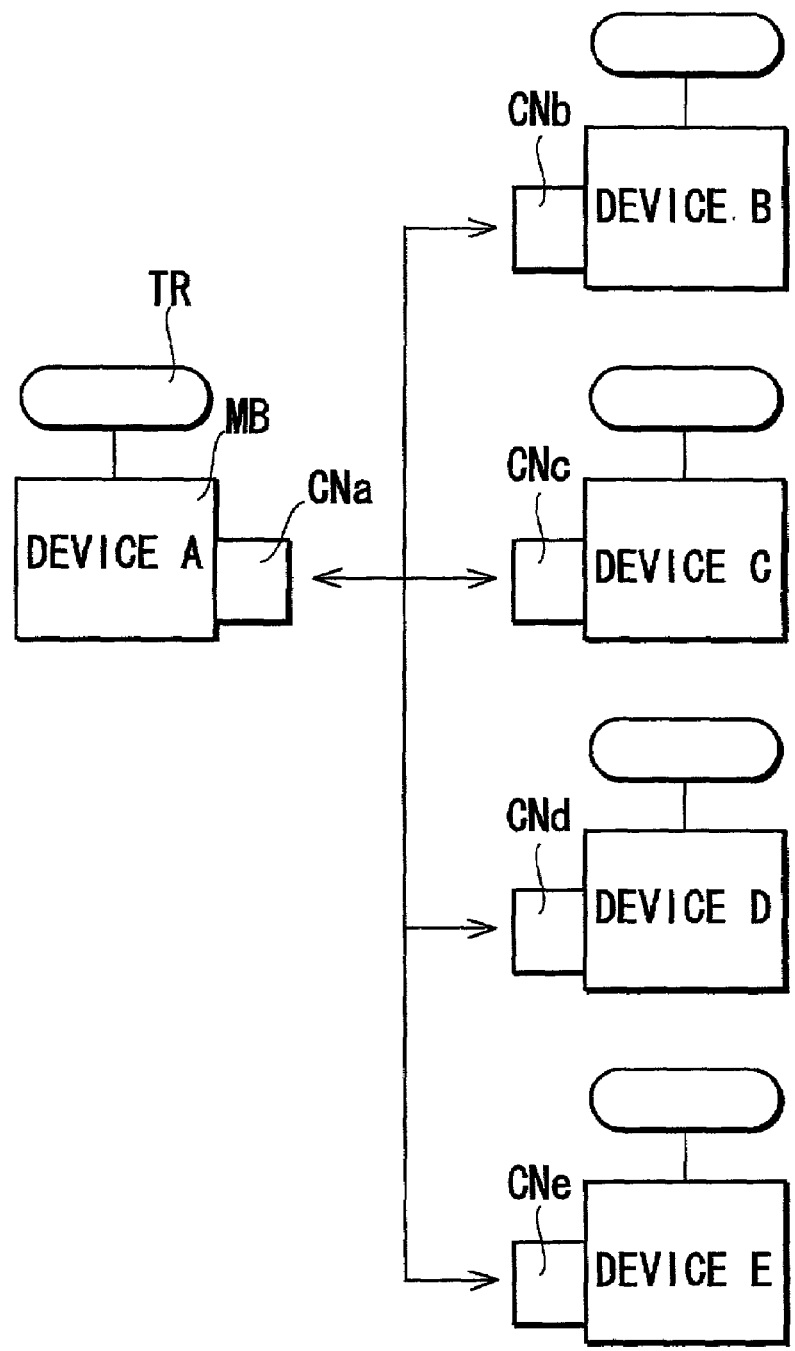
FIG. 5 is a drawing showing an example of the general configuration of a fourth embodiment of the present invention.

Specifically, in the case in which a plurality of communication devices exist within a region in which short-range communication is possible, it is possible, as shown in FIG. 5, to apply the present invention to the exchange of communication specification information between the communication devices A to E.

The fourth embodiment can be applied in the case in which communication devices B, C, D, and E can communicate only with communication device A, that is, in the case in which communication device A performs one-to-four communication with the communication devices B to E, but in which the communication devices B, C, D, and E perform only one-to-one communication with the communication device A; and in the case in which each of the communication devices B, C, D, and E can mutually communicate not only with the communication device A, but also mutually with other communication devices, that is, in which communication devices A to E each can perform one-to-four communication.

Thus, in the case of one-to-many communication, it is possible with the fourth embodiment, as described below, to exchange communication specification information between each of the communication devices.

In the fourth embodiment shown in FIG. 5, the communication devices A to E are provided, respectively, with connectors CNa to CNe. When exchanging communication specification information prior to one-to-four communication between the communication devices A to E, the connectors of the communication devices are sequentially directly electrically connected, so as to exchange communication specification information between the communication devices that are directly electrically connected.

In the case of the fourth embodiment, each of the communication devices has a buffer for the purpose of storing parties with which communication is performed, the exchanged communication specification information being stored in this buffer.

Figure 6:
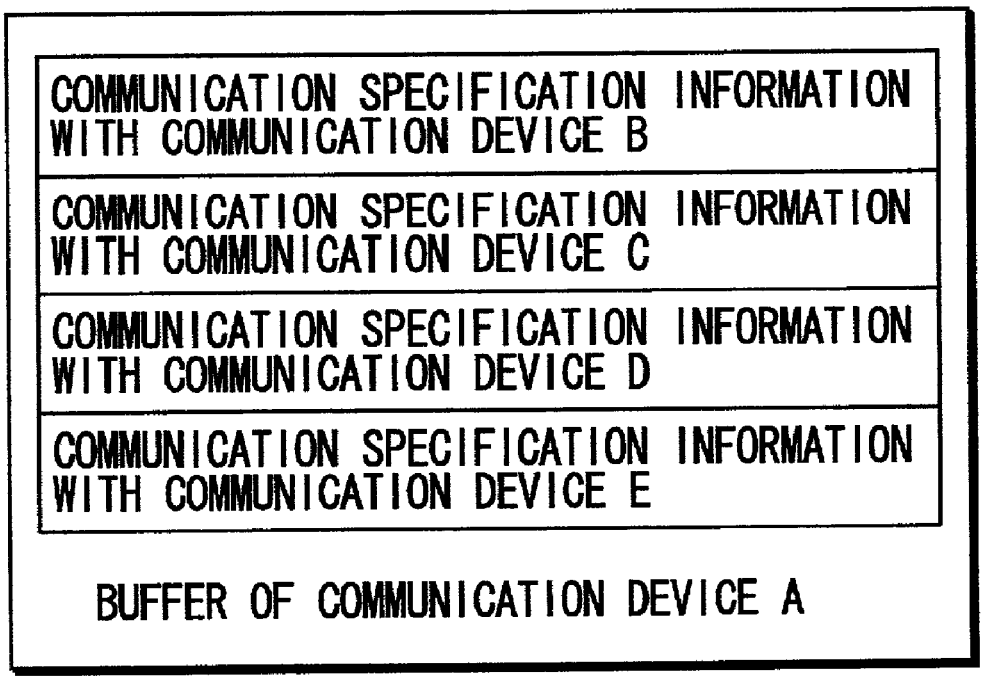
FIG. 6 is a drawing illustrating the communication buffer provided in a communication device A of the fourth embodiment, and communication specification information for each communication device stored therein.

That is, the communication device A, for example, has a buffer serving as a storage area, as shown in FIG. 6, into which are stored, when sequential connection is made of the connector CNa to the connectors CNb through CNe of the communication devices B to E, the communication specification information (random numbers) sent from each of the communication devices B to E, which are parties to the connection. Although in the example shown in FIG. 6, only the buffer of the communication device A is shown, the same type of storage of the communication specification information is made into the buffers of the other communication devices B to E as well, from the communication device A.

Communication Specification Information Exchange Processing in the Fourth Embodiment The process of exchanging communication specification information prior to one-to-many communication between communication devices in the fourth embodiment is described below, with reference being made to FIG. 7, which shows the communication specification information exchange performed by each of the communication devices performing one-to-many communication.

Figure 7:
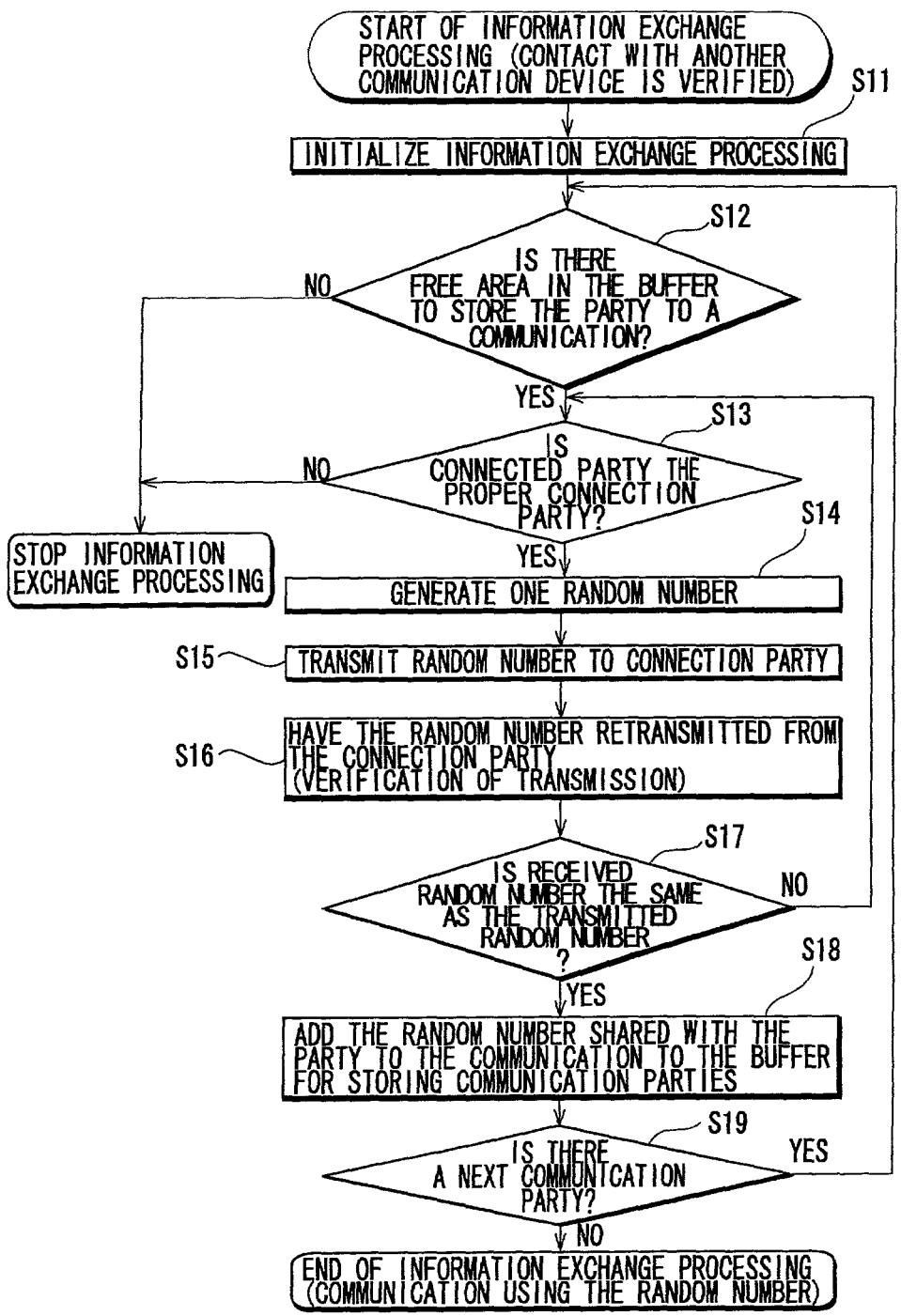
FIG. 7 is a drawing illustrating a process for exchanging communication specification information prior to one-to-one communication in the fourth embodiment.

First, in FIG. 7, when one of the communication devices (for example communication device A in FIG. 5) verifies that one of the other communication devices (for example, communication devices B to E in FIG. 5) is directly electrically connected thereto, at step S11, various settings for the purpose of communication specification information exchange processing are initialized, similar to the case described with regard to step S1 of FIG. 2.

Next, at step S12, the communication device checks to see whether there is a free storage area in the buffer used to store the communication party and, in the case in which there is no free area, the information exchange processing is stopped, but if there is free storage area, the processing proceeds to step S13.

When the processing proceeds to step S13, the communication device, similar to the case of step S3 in FIG. 2, determines whether the other communication device that is in direct electrical connection is a proper communication device. At step S13, if it is determined that the other communication device in direct electrical connection is not a proper communication device, the information exchange processing is stopped. If, however, it is determined at step S13 that the communication device is a proper party to the connection, processing proceeds to step S14.

When processing proceeds to step S14, the communication device, similar to step S3 in FIG. 2, generates the communication specification information as, for example, a random number, and then at step S15, similar to step S4 in FIG. 2, the random number is transmitted to the other communication device via the electrically connected part.

Next at step S16, the communication device, similar to steps S5 and S6 of FIG. 2, waits for return of the random number from the other communication device which is party to the connection. If the random number is returned, at step S17, a determination is made as to whether the returned random number is the same as the random number that was transmitted. If at step S17 it is determined that the received random number is not the same as the transmitted random number, return is made to step S13. If, however, it is determined that the received random number is the same as the transmitted random number, processing proceeds to step S18.

When processing proceeds to step S18, the communication device adds the random number shared with the other communication device to the buffer so as to register the communication device, whereupon processing proceeds to step S19.

When processing proceeds to step S19, the communication device determines whether there are other communication devices with which communication is to be performed. If there is, return is made to step S12, from which the above-noted processing is performed with regard to the other communication devices. At step S12, if there is no free area in the buffer for registering communication devices, because new information cannot be written thereinto, the processing is stopped, in which case, for example, the user deletes, of the communication devices registered in the buffer, information corresponding to a now unnecessary communication device, so as to free up buffer area. This processing, however, is performed separately from the information exchange processing of FIG. 7.

At step S19, if it is determined that there is no further communication device with which communication specification information exchange is to be performed, the communication device ends the information exchange processing, subsequent to which one-to-many communication is started using the communication specification information (random numbers) registered in the buffer.

The flow of the actual one-to-many communication is basically the same as the case of one-to-one communication, with communication data being sent after adding thereto communication specification information (a random number) In the case of one-to-many communication as well, similar to the above-described case of one-to-one communication, if it is desired to maintain the secrecy of the communication data, the above-noted shared random number can be used as an encryption key to encrypt the communication data. That is, in the case of the fourth embodiment as well, communication data that is transmitted and received between a communication device and other communication devices by one-to-many communication, each of the random numbers can be used to perform encryption, thereby enabling the maintenance of the secrecy of the communication data.

As described above, according to the fourth embodiment, a direct electrical connection is made between respective communication devices of a plurality of communication devices, and exchange of communication specification information is made in this connected condition, thereby enabling the achievement of one-to-many communication.

Fifth Embodiment

In the first embodiment to the fourth embodiment, the example described is that in which each of the parties to communication is connected via a direct electrical connection by a connector, in which condition communication specification information is exchanged. The present invention can also be achieved by a fifth embodiment, described below, in which communication specification information is exchanged via a relay station.

Figure 8:
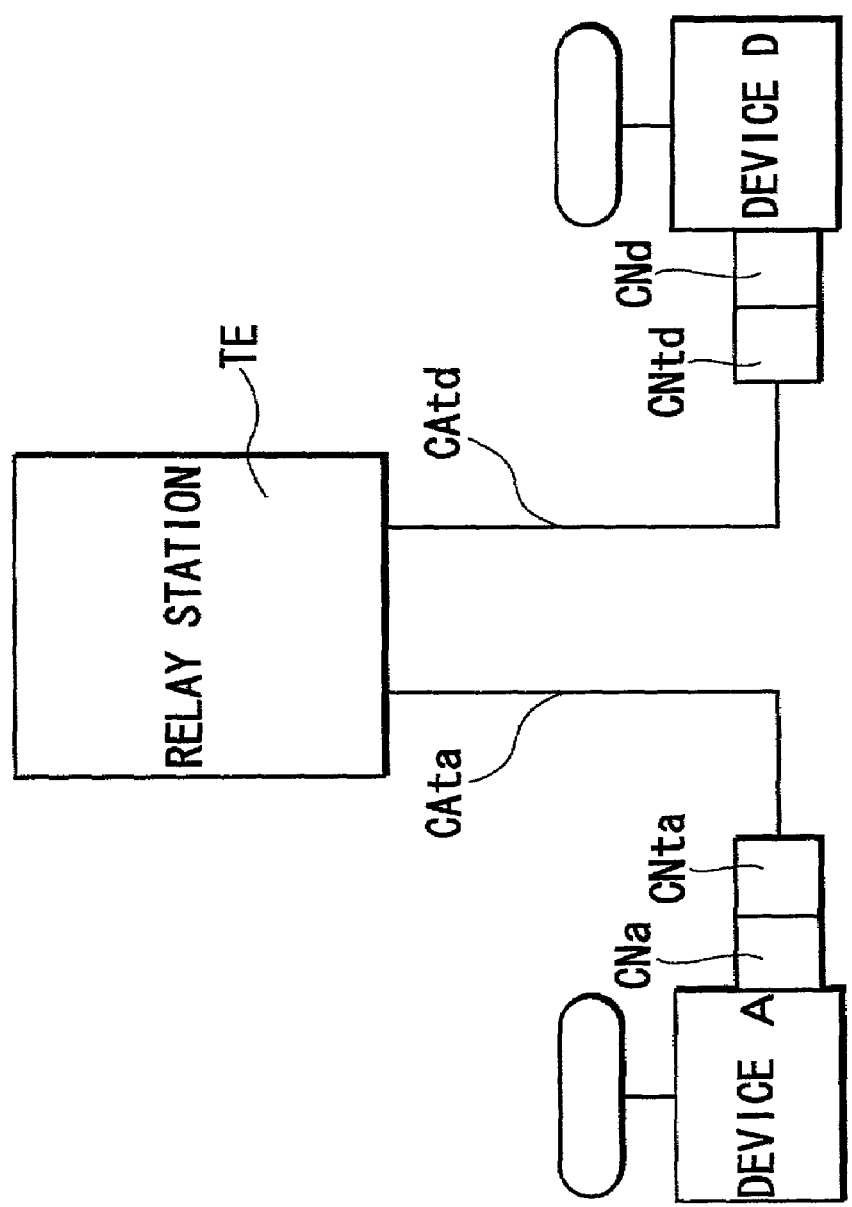
FIG. 8 is a drawing showing the general configuration of a fifth embodiment of the present invention.

In the fifth embodiment, as shown in FIG. 8, a connector CNta is connected to a relay station TE via a cable CAta, and a connector CNtd is connected to the relay station TE via a cable CAtd, the connector CNta being electrically connected to the connector CNa, and the connector CNtd being electrically connected to the connector CNd. In this case, exchange of communication specification information prior to one-to-one communication between communication devices A and D is performed via the relay station TE, which is electrically connected by the above-noted connectors and cables.

More specifically, for example, communication device A transmits information specifying itself to the relay station TE via the electrically connected cable CAta and connector CNta, and the relay station TE transmits this information to the communication device D via the electrically connected cable CAtd and connector CNtd. In the same manner, communication device D transmits information specifying itself to the relay station TE via the electrically connected cable CAtd and connector CNtd, and the relay station TE transmits this information to the communication device A via the electrically connected cable CAta and connector CNta.

In an embodiment such as the fifth embodiment, if communication specification information is exchanged via the relay station TE, there is no need to make an electrical connection between communication devices and, for example, even in a case in which the communication devices are at such a distance from one another that it would be difficult, such as in the third embodiment, to make a connection therebetween by means of a predetermined cable, it is possible, using a relay station, to perform exchange of communication specification information as if there were an actual electrical connection. In the fifth embodiment, because the processing for exchange of communication specification information and the processing for one-to-one communication thereafter are the same as in the first to third embodiments, this processing will not be described herein.

Flow of Information Exchange in the Case in Which the Relay Station is Provided With a Buffer In the fifth embodiment of the present invention, in the case of performing communication specification information exchange via the relay station TE, it is possible to provide a buffer within the relay station TE for the purpose of registering the communication device parties to the communication as described with regard to the fourth embodiment. The exchange of communication specification information in the case in which the relay station TE is provided with a buffer for the registration of communication device parties to the communication is conducted according the flowchart shown in FIG. 9 and described below. The example shown in FIG. 9 is that in which a random number is used as the communication specification information.

Figure 9:
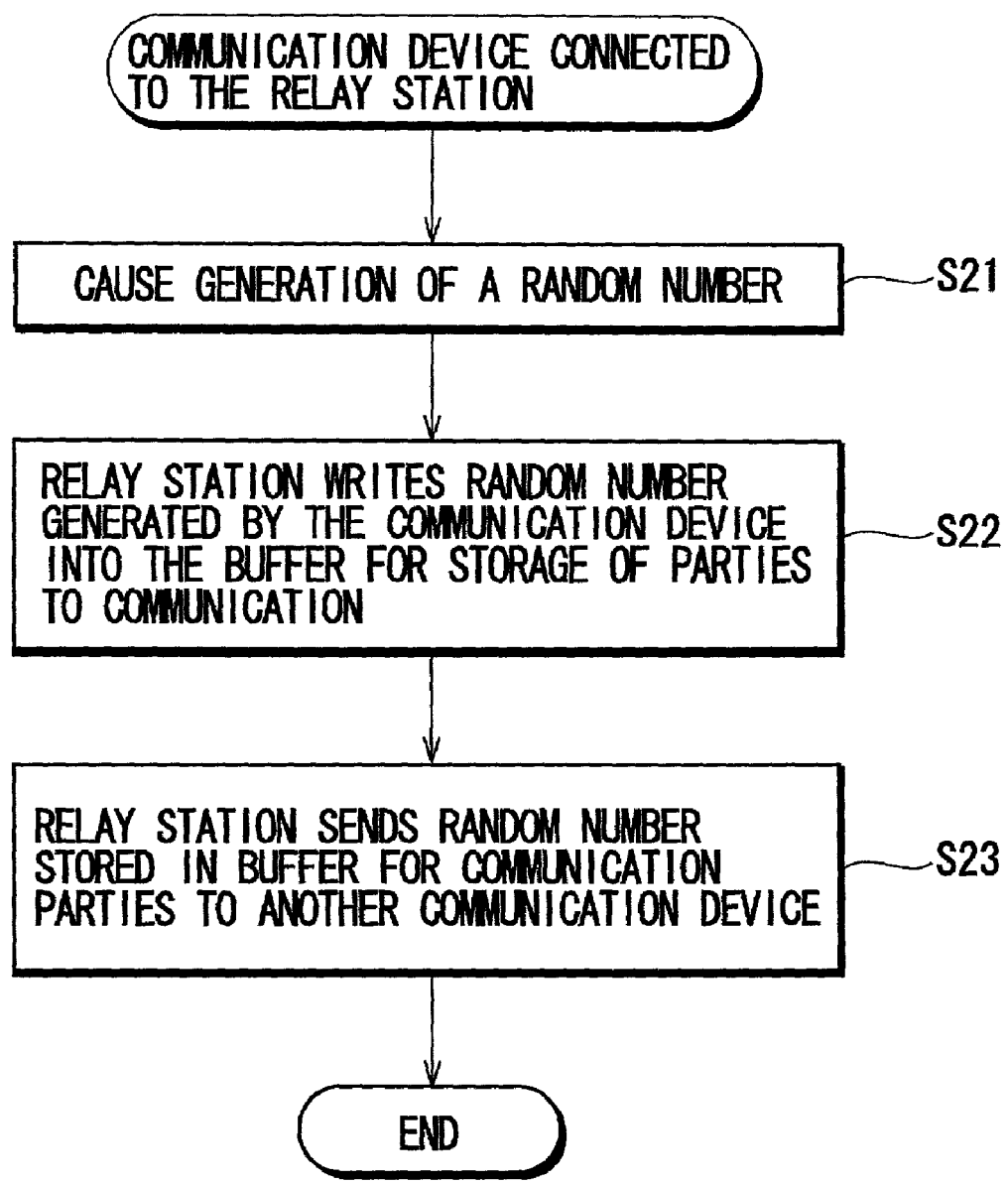
FIG. 9 is a flowchart illustrating a process for exchanging communication specification information between communication devices via a relay station in the fifth embodiment.

In FIG. 9, when a first communication device (taken as the communication device A in the description below) is connected to the relay station TE via the above-noted connectors (CAta and CNta), first, at step S21, the communication device A generates communication specification information (a random number) specifying itself and transmits this information to the relay station TE via the electrically connected part (connectors CAta and CNta). When this is done, a second communication device (taken as the communication device D in this case) can be connected to the relay station TE via the connectors CAtd and CNtd, or can alternatively not be connected thereto.

Upon receiving the random number as communication specification information from the communication device A, the relay station TE, at step S22, writes the random number so as to store the communication device party to the communication into the buffer which is provided within the relay station TE.

Next, when the communication device D is connected to the relay station TE via the above-noted connectors (CAtd and CNtd), at step S23, the random number (communication specification information of the communication device A) is read out from the buffer at the relay station TE, and this random number is transmitted to the communication device D via the electrically connected part (connectors CAtd and CNtd).

In the case of connection of the communication device D to relay station TE via the above-noted connectors (CAtd and CNtd), the processing at step S21 and thereafter is performed as well with respect to the communication device D.

Specifically, when the communication device D is connected to the relay station TE, the communication device D receives the communication specification information (random number) of the first communication device A transmitted from the relay station TE and, at step S21, it generates communication specification information (a random number) identifying itself and transmits this to the relay station TE via the electrically connected part (connectors CAtd and CNtd). When this is done, the communication device A can be connected to the relay station TE or can alternatively not be connected thereto.

Upon receiving the random number from the communication device D, the relay station TE, at step S22, writes the random number into the buffer within the relay station TE.

Thereafter, if, for example, the communication device A is connected again to the relay station TE, at step S23, the random number (communication specification information of the communication device D), which is registered in the buffer at the relay station TE, is read out therefrom, this random number being transmitted to the communication device A via the electrically connected part.

As described above, if a buffer is provided in the relay station TE for the purpose of registering communication devices to be party to communication, it is possible to achieve exchange of the communication specification information without simultaneously connecting each of the communication devices A and D to the relay station TE.

Although the foregoing description of the fifth embodiment is for the example in which the relay station TE is provided with only the function of relaying communication specification information to be exchanged between the communication device A and the communication device D, the communication devices themselves can be provided with this relaying function. In this case, if communication specification information is exchanged between the communication device A and the communication device D, first communication specification information used when performing wireless communication with the communication device A is transferred to the communication device D.

Sixth Embodiment

In a sixth embodiment of the present invention, described below, in a system in which one-to-many communication is performed between a plurality of (3 or more) communication devices, the exchange of communication specification information is performed via a relay station, similar to the case of the fifth embodiment. Specifically, in the sixth embodiment, one-to-many communication is made possible after performing exchange of communication specification information by a plurality of communication devices.

In this case, in the sixth embodiment, a communication device connected to the relay station will be referred to as a primary communication device, and each communication device performing one-to-many communication with the primary communication device will be referred to as a second communication device. In this embodiment, the primary communication device is capable of performing one-to-many communication (one-to-four communication) with each of a plurality of (four in the case of this embodiment) second communication devices, and the primary communication device has a buffer with storage capacity sufficient for the second communication devices to which the primary communication device can be connected. The relay station TE in the sixth embodiment is provided with a buffer capable of storing the communication specification information (for example, random numbers) for the primary communication device and the second communication devices that can communicate therewith.

Connection Relationship Between the Communication Devices and the Relay Station

Figure 10:
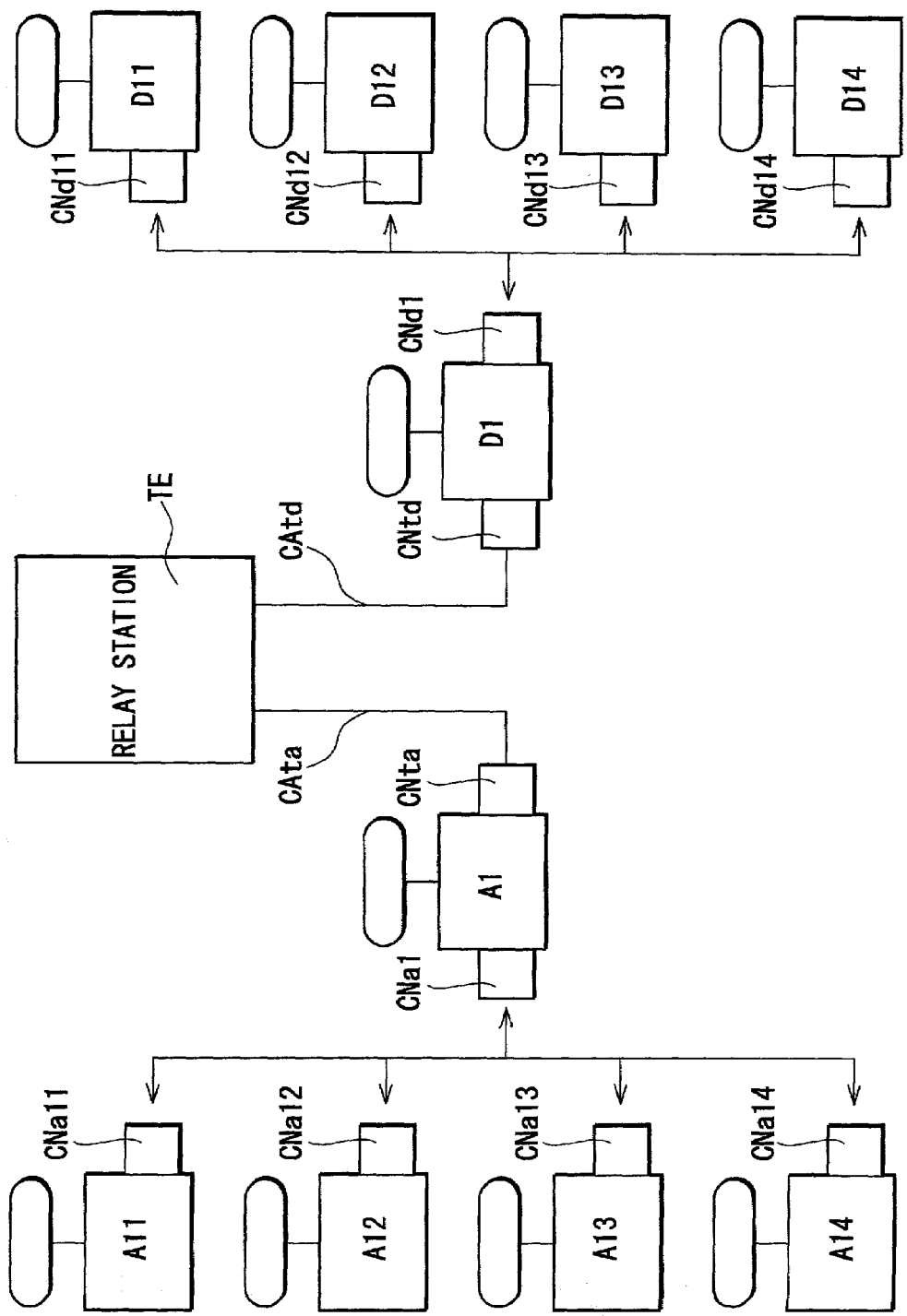
FIG. 10 is a drawing showing an example of the general configuration of a sixth embodiment of the present invention.

In the sixth embodiment, as shown in FIG. 10, the relay station TE has a connector CNta connected to it via a cable CAta, and a connector CNtd connected to it via a cable CAtd.

When exchanging communication specification information prior to one-to-many communication, the primary communication device is first connected to the second communication devices. In the example shown in FIG. 10, the primary communication device A1 is electrically connected to the relay station TE via the connector CNta, and the primary communication device D1 is connected to the relay station TE via the connector CNtd.

Next, after making connection between the relay station TE and the primary communication devices, an electrical connection is made between the second communication devices and the primary communication device, in the condition in which the relay station TE is connected to the primary communication device. In the example shown in FIG. 10, the connector CNa1 of the primary communication device A1 is sequentially connected to the connectors CNa11 to CNa14 of each of the second communication devices A11 to A14, and the connector CNd1 of the primary communication device D1 is sequentially connected to the connectors CNd11 to CNd14 of each of the second communication devices D11 to D14. In the example shown in FIG. 10, although the second communication devices A11 to A14 are connected to the primary communication device A1 and the second communication devices D11 to D14 are connected to the primary communication device D1, this is merely one example, and it will be readily understood that, within the number of connectable devices (4), it is possible to make connection of primary communication devices A1 and D1 with any arbitrary secondary devices among second communication devices A11 to A14 and D11 to D14.

Processing for Electrical Connection Between the Relay Station and the Primary Communication Devices.

Figure 11:
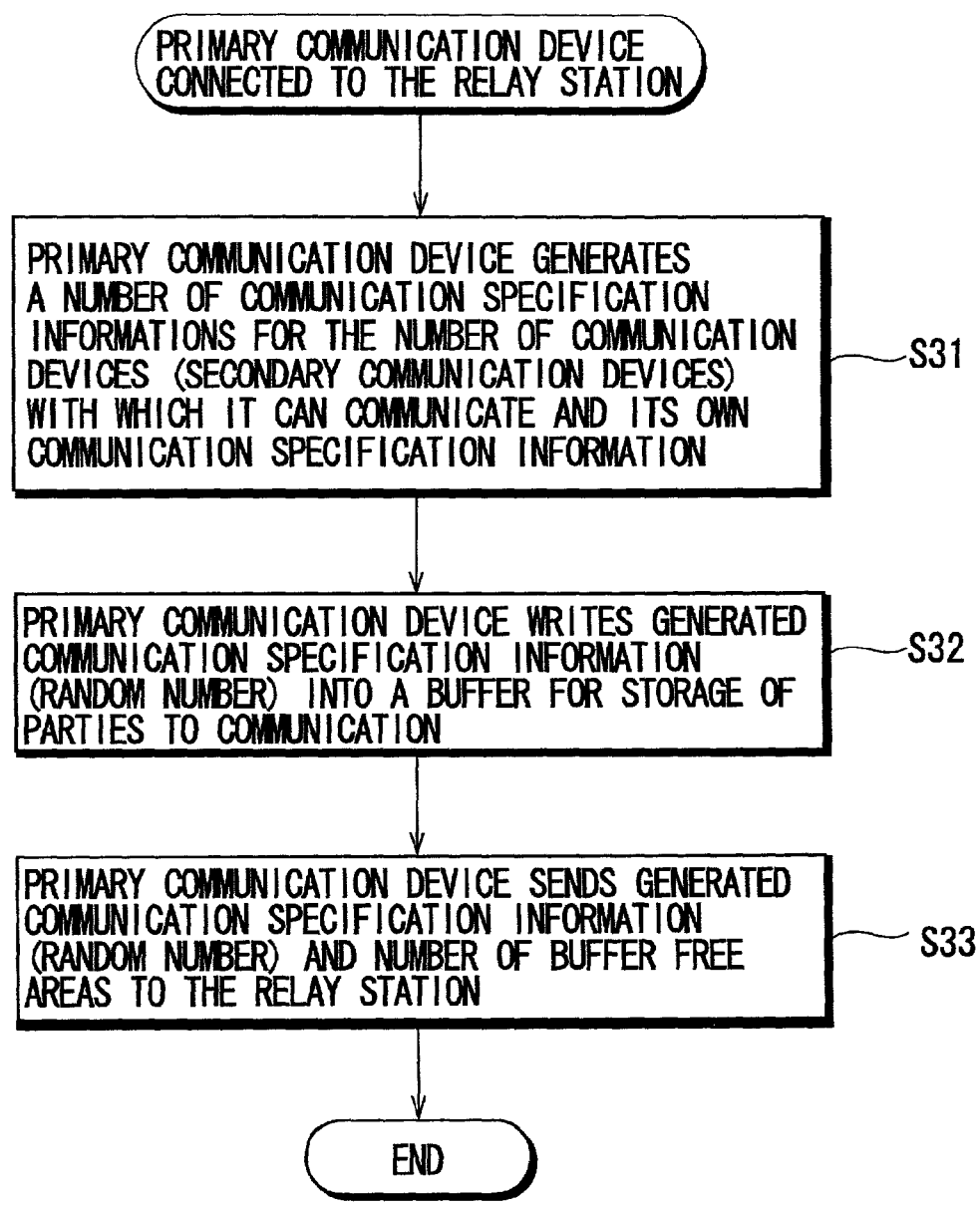
FIG. 11 is a flowchart illustrating a process for transmitting and receiving communication specification information between a primary communication device and a relay station in the sixth embodiment.

FIG. 11 shows the process when an electrical connection is made between the relay station TE and the primary communication device A1 or D1.

In FIG. 11, when, for example, the primary communication device A1 is connected to the relay station TE via the cable CAta and the connector CNta, first the primary communication device A1, at step S31, generates its own communication specification information (random number) and communication specification information (random numbers) corresponding to the secondary communication devices (4 in the case of this embodiment) with which it can communicate.

Next, the primary communication device A1, at step S32, writes its own communication specification information and the communication specification information corresponding to the second communication devices with which it can communicate (4 random numbers) into the buffer for registration of the parties to communication. At this point, however, the usage condition of the buffer storage area is treated as being free, as opposed to being used.

After the above, the primary communication device A1, at step S33, transmits to the relay station TE via the connectors CAta and CNta the communication specification information (4 random numbers) generated and stored in the buffer as noted above, and information indicating the number of free locations in the buffer, this being 4 free locations at this point.

At this point in time, at the relay station TE, information transmitted from the primary communication device A1 is written into the buffer provided within the relay station TE for the purpose of registering the parties to communication.

Similarly, in the case in which the other primary communication device D1 is connected to the relay station TE via the connectors CAtd and CNtd, the processing at step S31 and thereafter is performed with respect to the primary communication device D1.

Specifically, when the primary communication device D1 is connected to the relay station TE, the primary communication device D1, at step S31, generates its own communication specification information and communication specification information corresponding to the number of secondary devices with which it can communicate (4 random numbers).

Next, the primary communication device D1, at step S32, writes its own communication specification information and the communication specification information corresponding to the second communication devices with which it can communicate (4 random numbers) into the buffer for registration of the parties to communication. At this point, however, the usage condition of the buffer storage area is treated as being free, as opposed to being used.

After the above, the primary communication device D1, at step S33, sends to the relay station TE via the connectors CAtd and CNtd the communication specification information stored in the buffer (4 random numbers) and information indicating the number of free locations in the buffer, this being 4, as the number of storage locations that are set as free.

At this point in time, at the relay station TE, information transmitted from the primary communication device D1 is written into the buffer provided for registration of the parties to communication.

Processing When a Secondary Communication Device is Electrically Connected

The process when an electrical connection is made between a secondary communication device and a primary communication device is described below, with reference made to FIG. 12 and FIG. 13. In the sixth embodiment, the second communication device is electrically connected to a primary communication device when the primary communication devices A1 and D1 are connected to the relay station TE.

Figure 12:
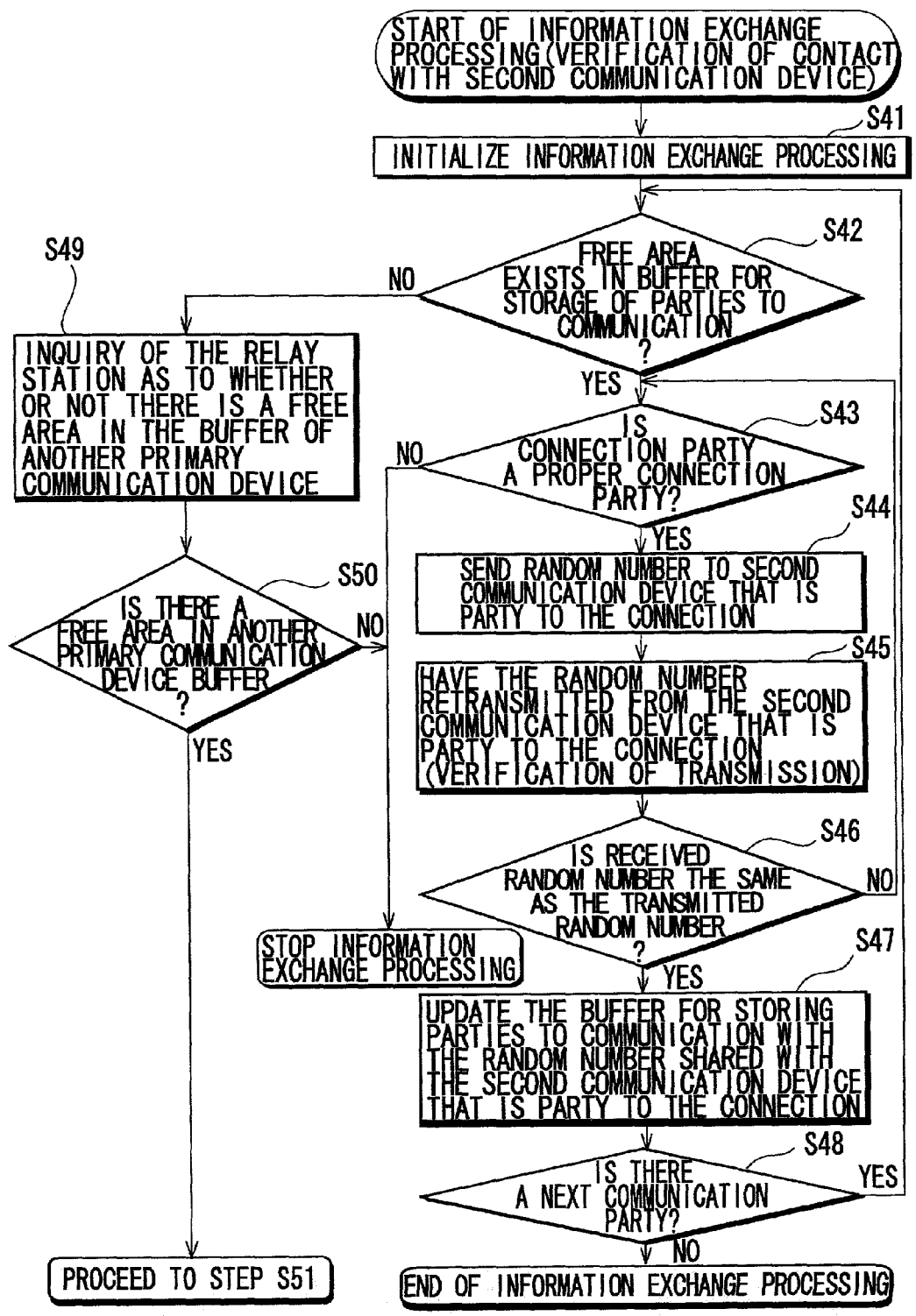
FIG. 12 is a flowchart illustrating a process for exchanging communication specification information between a primary communication device and a secondary communication device via a relay station in the sixth embodiment.

First, referring to FIG. 12, when a primary communication device (for example, the primary communication device A1 in FIG. 10) verifies that one of the second communication devices with which communication is possible (for example, the communication devices A11 to A14 in FIG. 10) is electrically connected as noted above, at step S41, various setting values for the purpose of communication specification information exchange processing are initialized.

Next, at step S42, the primary communication device A1 determines whether there is a free area within the internal buffer for registering parties to communication (the areas for which the free condition is set). If there is no free location, processing proceeds to step S49. If there is a free location, however, processing proceeds to step S43.

When the processing proceeds to step S43, the primary communication device A1 determines whether the directly electrically connected second communication device is a proper communication device. If at step S43 the determination is made that the directly electrically connected second communication device is not a property party for communication, the processing for information exchange is stopped. If, however, it is determined that the communication device is a proper party for communication, processing proceeds to step S44.

When processing proceeds to step S44, the primary communication device A1 transmits one of the 4 random numbers (communication specification information) written into the buffer at the previous step S31 shown in FIG. 11 to the second communication device that is the party to the communication, via the electrically connected connection part (connector and cable).

Next, at step S45, the primary communication device A1 waits for return of the transmitted random number from the above-noted second communication device and, if a random number is returned, at step S46, determines whether the returned random number is the random number that was transmitted. If at step S46 it is determined that the received random number is not the same as the transmitted random number, return is made to step S43. However, if it is determined that the random number is the same as the transmitted random number, processing proceeds to step S47.

When processing proceeds to step S47, the primary communication device A1 updates the buffer for registering parties to communication with the random number shared with the second communication device that is a party to communication (for example, by overwriting a random number in the buffer), and updates the usage condition of the buffer based on the free locations in the buffer, and, after updating the internal buffer usage condition set at the previously executed step S32 of FIG. 11, processing proceeds to step S48.

When processing proceeds to step S48, the primary communication device A1 determines whether there is any other second communication device with which communication specification information is to be exchanged. If this determination indicates that there is, return is made to step S42, and the above processing is performed with respect to the additional second communication device.

The processing up to this point, with the exception of the new generation of a random number between steps S43 and S44, is substantially the same as the processing shown in FIG. 7 with regard to the fourth embodiment.

In contrast to the above, the distinction of the sixth embodiment of the present invention with respect to the fourth embodiment is, for example, in the case in which there is no free (unused) area in the internal buffer for registering parties to communication within the primary communication device A1. Rather than interrupting the information exchange processing as in the example of FIG. 7, if it is known by inquiry to the relay station TE that there is a free storage area in the area used for storage of random numbers by another primary communication device (for example, in the primary communication device D1), information is exchanged with a new second communication device (newly electrically connected second communication device) using the random number stored in that free area, thereby enabling communication between the new second communication device and the above-noted other primary communication device (D1).

Specifically, according to the sixth embodiment, when the primary communication device A1, for example, has already completed information exchange with all second communication devices up to the limit of which it can perform one-to-many communication, so that it cannot perform communication with any additional second communication devices, if the primary communication device D1 has not yet performed one-to-many communication with all the second communication devices up to its limit for performing communication and if a new second communication device is in a condition in which it can be added, performing information exchange with the new second communication device via the relay station TE by the primary communication device A1 makes it possible to achieve the same condition as when the primary communication device D1 performs information exchange with the new second communication device.

More specifically, if, for example, the primary communication device A1 is in a condition in which it has already completed information exchange between it and the above-noted 4 second communication devices A11 to A14, but there is, of the 4 second communication devices D11 to D14, for example D14, with which the primary communication device D1 has not performed information exchange, when the primary communication device A1 uses a random number stored in the internal buffer of the relay station TE (storage area in the free condition) to perform information exchange with the second communication device D14, the relay station TE notifies the primary communication device D1 that the free buffer has been assigned to the second communication device D14, and further the primary communication device D1, upon being thus notified of the usage condition of the free buffer area, updates the usage condition to the used condition, and the second communication device D14 goes into the condition in which it can communicate with the primary communication device D1.

In order to achieve the above-described operation, at step S48 a new second communication device is electrically connected to the primary communication device A1, after which processing proceeds to step S42, at which a determination is made as to whether there is a free buffer location (storage area in the free condition), at which point the primary communication device A1 inquires of the relay station TE whether there is a free region within the storage area into which random numbers are stored by the other primary communication device (primary communication device D1).

Figure 13:
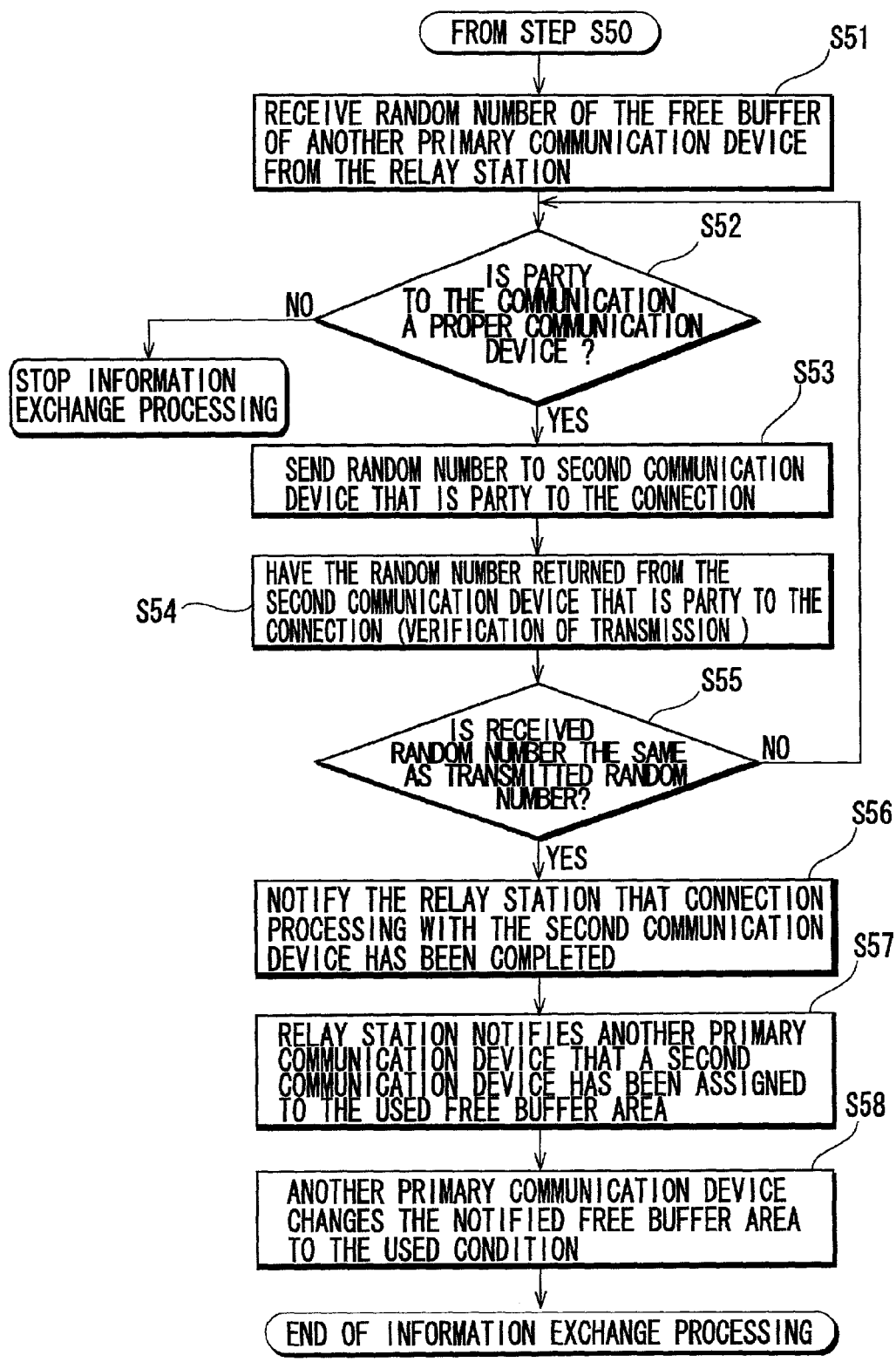
FIG. 13 is a flowchart illustrating a process according to the sixth embodiment in which, by the intervention of a relay station, one primary communication device performs the assignment of a secondary communication device paired with another primary communication device.

Next, processing proceeds to step S50, at which, as a result of the inquiry made at step S49, in the case in which it is determined that there is no free region in the storage area into which random numbers are stored by the primary communication device D1, the information exchange processing is stopped, but if it is determined there is a free region, processing proceeds to step S51 of FIG. 13.

When processing proceeds to step S51 of FIG. 13, the primary communication device A1 receives from the relay station TE a random number stored in a free storage area of the internal buffer of the relay station TE into which random numbers are stored by the primary communication device D1.

Next, processing proceeds to step S52, at which the primary communication device A1 determines whether the newly electrically connected second communication device at step S48 is a proper communication device. If at step S52 it is determined that this second communication device is not a proper connection party, the information exchange processing is stopped. If, however, it is determined at step S52 that the communication device is a proper device for connection, processing proceeds to step S53.

When processing proceeds to step S53, the primary communication device A1 transmits the random number read out from the internal buffer of the relay station TE by the processing of step S51 to the secondary communication device that is the party to the connection.

Next, at step S54, the primary communication device A1 waits for return of the transmitted random number from the connected second communication device and, if a random number is returned, at step S55, determines whether the returned random number is the same random number as was transmitted. If at step S55 it is determined that the returned random number is not the same as that which was transmitted, return is made to step S52, but if the received random number is the same as the random number transmitted, processing proceeds to step S56.

When processing proceeds to step S56, the primary communication device A1 reports to the relay station TE that information exchange with the new second communication device has been completed.

Upon receiving this report, the relay station TE, at step S57, notifies the primary communication device D1 that the new second communication device has been assigned to the storage area in the internal buffer from which the random number has been read (storage area into which the random number was set by the primary communication device D1).

When this is done, the primary communication device D1, at step D58, updates the usage condition of the storage area notified by the relay station TE to the used condition.

As described above, by using the sixth embodiment of the present invention, it is possible to implement an address book for each primary communication device and second communication device. For example, when each communication device performs communication, the communication specification information for each is transmitted to the relay station, whereat the thus transmitted communication specification information is stored in a table that can be accessed by each of the communication devices. By doing this, in a case in which it is necessary to have the communication specification information for each of the communication devices in order for a communication device to communicate with another communication device, it is sufficient to merely look up the communication specification information of the other party to the communication from this table.

Additionally, in the case in which the communication specification information for each communication device is pre-established, rather than having each of the communication devices initially send its own communication specification information to the relay station, it is alternatively possible to prepare the communication specification information for each communication device at the relay station.

Additionally, in the sixth embodiment of the present invention, similar to the last part of the description of the fifth embodiment, it is possible to provide communication devices with the function of the relay station TE.

Seventh Embodiment

In a system in which, as described with regard to the sixth embodiment, communication specification information is passed to another communication device via a relay station, the cost can be reduced by applying what is described below as the seventh embodiment of the present invention.

In the sixth embodiment, communication specification information for a second communication device with which communication is to be done, is stored within the primary communication device. That is, in order to enable storage of the communication specification information, a buffer is provided in the primary communication device for storing this information. This buffer can be implemented as a RAM, which requires a backup power supply, or a flash ROM, which does not require a backup power supply. In either case, however, the use of such a buffer increases the cost of the primary communication device.

Given the above, in the seventh embodiment of the present invention, the primary communication device buffer function is provided in the relay station, thereby reducing the cost of the primary communication device, but achieving the same type of effect as achieved by the sixth embodiment.

In the seventh embodiment, the primary communication device assumes that it is connected to a relay station, and that the operating power supply of the primary communication device is provided by the relay station. Although there is no buffer in the primary communication device for holding communication specification information (random numbers), it has a RAM used by an internal microcomputer, so that when communication is performed with a second communication device with the primary communication device connected to the relay station, the communication specification information of the second communication device is held in the RAM of the microcomputer. However, if the power supply of the relay station is switched off, or if the connection with the relay station is broken, so that the power supplied from the relay station is stopped, the information written in this RAM is lost, making it necessary to again perform information exchange processing when the power supply is switched on again, or when the connection is made again. For this reason, in this embodiment, by storing the communication specification information in the buffer of the relay station, it is possible to achieve a low-cost primary communication device which does not require a RAM requiring a battery backup or a flash ROM.

Figure 14:
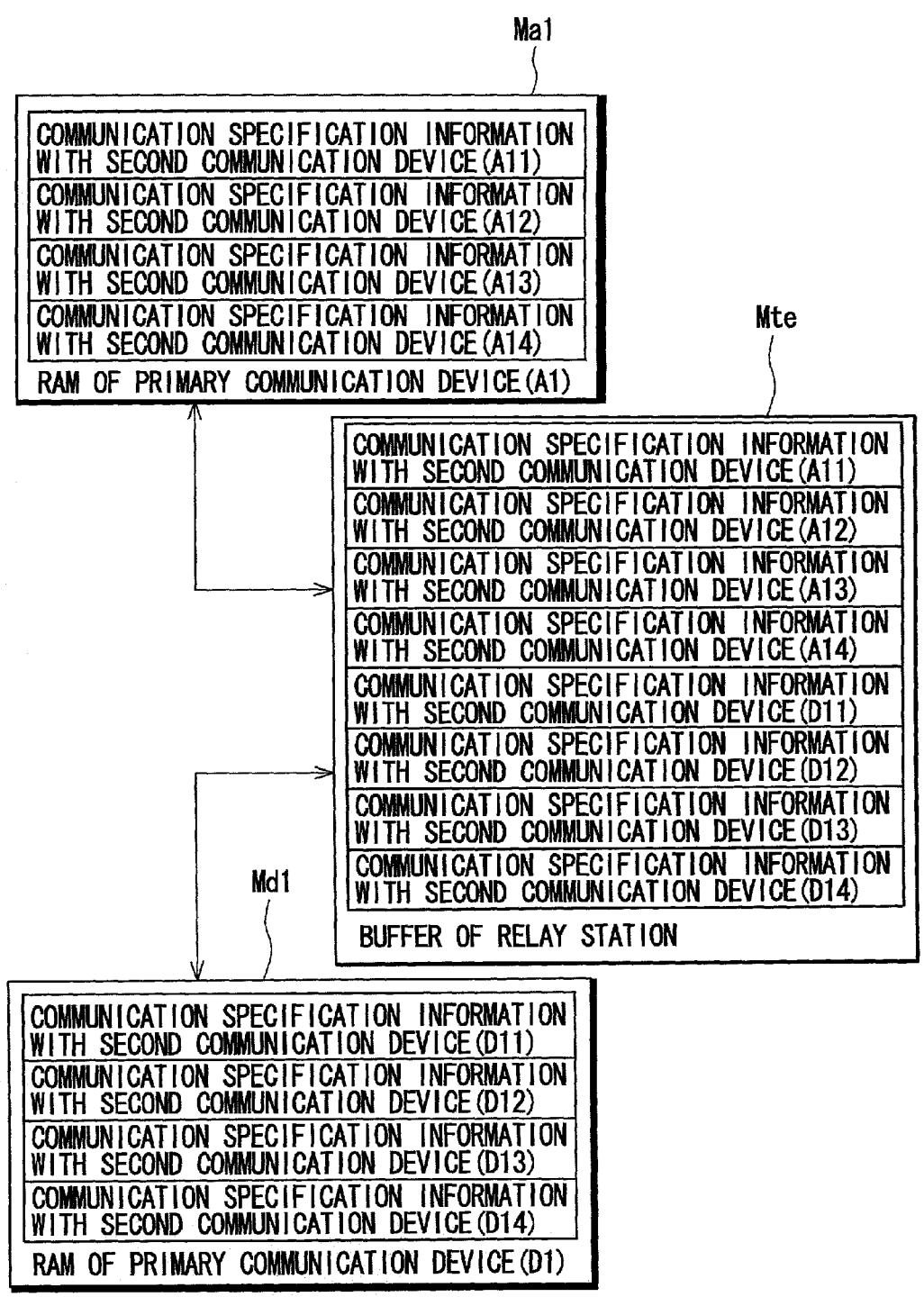
FIG. 14 is a drawing illustrating communication specification information transmitted, received, and stored between a RAM of a primary communication device and a buffer of a relay station in a seventh embodiment of the present invention.

That is, described using FIG. 14, and referring to the system configuration shown in FIG. 10, in this embodiment, a buffer Mte is provided within the relay station TE, this buffer being capable of storing a number of communication specification information (8) which is the product of the number of primary communication devices connectable to the relay station TE (2) and the number of second communication devices with which the primary communication devices A1 or D1 can communicate (4, these being A11 to A14 or D11 to D14). The buffer Mte provided within the relay station TE is a non-volatile storage area (battery backed-up RAM, flash ROM, or hard disk or the like), or a secondary storage device that can be installed in and removed from the relay station.

In the case in which the primary communication device (A1 or D1) exchanges information with a second communication device (A11 to A14 or D11 to D14), the communication specification information set by each of these information exchanges is written into the RAM of the internal microcomputer (Ma1 or Md1), simultaneously with which it is transmitted to the relay station TE.

Upon receiving this communication specification information, the relay station TE stores the communication specification information in its internal buffer Mte.

By doing this, if, for example, the power supply of the relay station TE is switched off, or if the connection with the relay station TE is interrupted, so that the power supplied from the relay station is stopped, although the communication specification information of the second communication devices (A11 to A14 or D11 to D14) stored in the internal RAM at the primary communication device A1 or D1 is lost, when the power supply of the relay station TE is switched on again or the connection is made again, by reading out the communication specification information stored in the internal buffer Mte of the relay station TE, it is possible to perform communication with each of the second communication devices, without the need to perform the processing for exchanging information again.

The assumption is made that the second communication devices are unconnected to the relay station TE, have independent configurations, and are difficult to supply with external power. Therefore, they are provided with batteries. Thus, because the second communication devices are provided with the required RAM to serve as storage to enable the storage of the communication specification information, either a cost increase is not incurred, or the incurred cost increase is small.

Example of Application of Embodiments of the Present Invention to an Entertainment System A specific example of applying the above-described first to seventh embodiments of the present invention that can be envisioned is their application to an entertainment system having the function of a video game machine.

For example, in the past the video game machine had a main unit with a game controller connected thereto by a cable, and there was a desire to be able to control the hardware, the progress of the game, and characters appearing in the game remotely, from a wireless game controller. In the case of using a game controller to control a game using a wireless connection, there is basically a one-to-one connection established between the video game machine and the game controller.

Of the available video games, however, there are many games that are played not only by just one player, but also by a plurality of players simultaneously.

Thus, in the case of a wireless game controller in a simultaneous multiple-player game of this type, at the video game machine itself it is necessary to individually specify the plurality of game controllers. That is, if the video game machine does not specify individual game controllers among the plurality of game controllers, it is not possible for the video game machine to determine from which game controller an operating signal has been supplied, making it impossible to establish correspondence between the game controller operation and the progress of the game or control of the characters appearing therein, thereby destroying the game.

Given the above situation, if the foregoing described embodiments of the present invention are applied to an entertainment system in which wireless communication is performed between an entertainment apparatus having a function such as the above-noted video game machine and a controller performing remote control, it is possible to play a game with simultaneous multiple players, without destroying the game.

Example of Application of the First Embodiment to an Entertainment System

Figure 15:
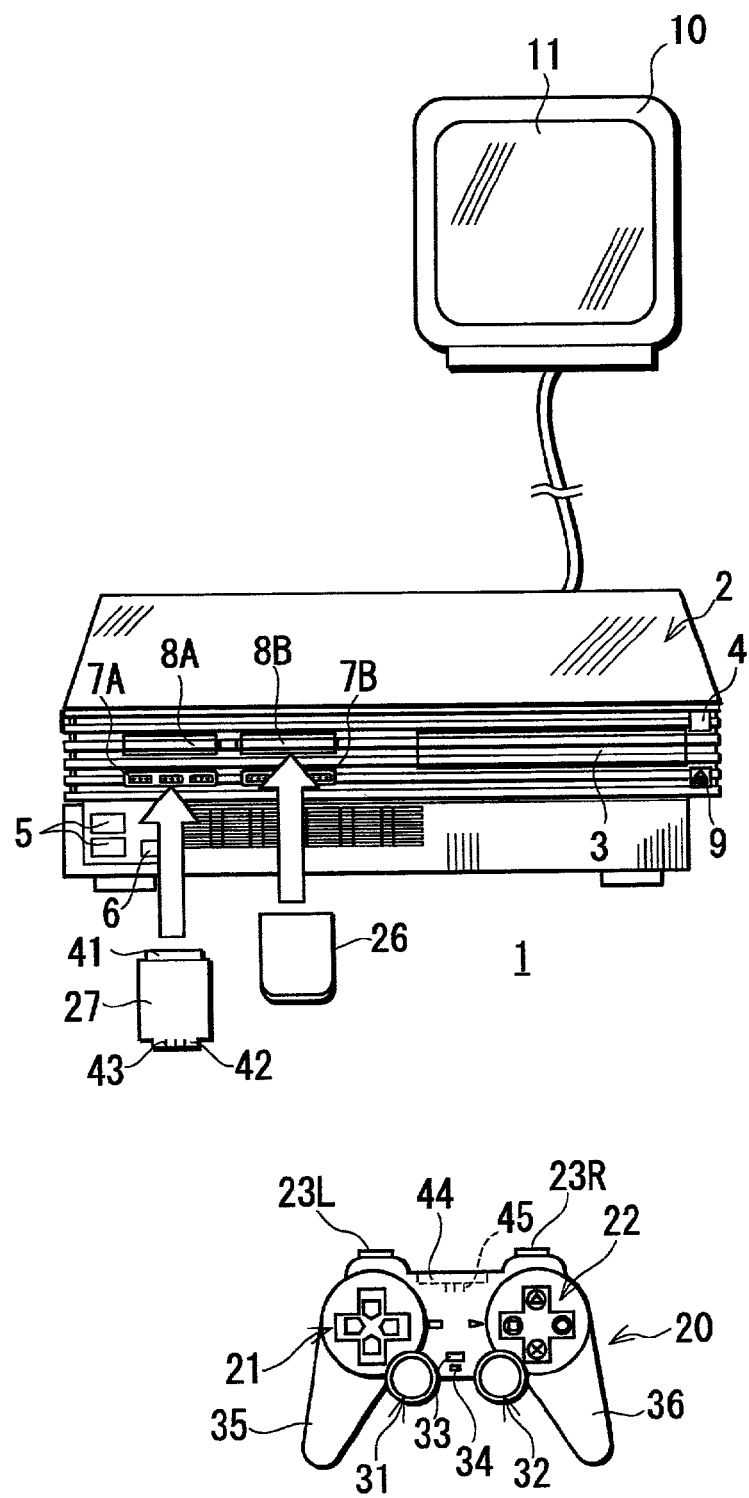
FIG. 15 is a drawing showing an example of the general system configuration for a case in which the first embodiment of the present invention is applied to an entertainment system.

FIG. 15 shows the general configuration of the application to an entertainment system of a system in which communication specification information is exchanged by direct electrical connection, without using a cable.

The main constituent elements of the entertainment system shown in FIG. 15 are an entertainment apparatus 2, a controller 20 having a wireless communication function and serving as an operation terminal device for control by a user (player), a transceiver 27 which is connected to a controller port 7A or 7B of the entertainment apparatus 2, and which performs wireless communication with the controller 20, and a TV receiver 10 having a monitor screen 11 displaying a game screen or television screen or the like. The example shown in FIG. 15 is one in which the entertainment apparatus 2 does not have a wireless communication function, in which the communication between the controller 20 and the entertainment apparatus 2 is performed by wireless communication via the transceiver 27.

General Description of the Entertainment Apparatus

While the internal circuit configuration of the entertainment apparatus 2 will be described later, the entertainment apparatus 2 has remote card slots 8A and 8B enabling free installation and removal of a memory card 26, controller ports 7A and 7B to which can be removably connected the transceiver 27, a disc tray 3 into which is placed, for example, a DVD-ROM or a CD-ROM or the like, an open/close button 9 for opening and closing the disc tray 3, an on/standby/reset button 4 for switching the power on and off and performing reset of a game, an IEEE (Institute of Electrical and Electronics Engineers) 1394 connector 6, and two USB (Universal Serial Bus) connectors 5. Although not shown in the drawing, the entertainment apparatus 2 is provided on its rear panel with such elements as a power switch, an audio/video output connector (AV multi-output connector) a PC card slot, an optical digital output connector, and an AC line input connector or the like. Furthermore, although not illustrated in the drawing, in the case in which a controller performs cable-connected communication with the entertainment apparatus 2, a connector at the end of the cable is connected to the controller ports 7A and 7B.

The entertainment apparatus 2 executes a game application program read out from an optical disc, such as the above-noted CD-ROM or DVD-ROM, or from a semiconductor memory, or a game application program downloaded via various communication circuits, such as a telephone line, a LAN, a cable TV circuit, or a communications satellite circuit, as well as instructions from a player received via the controller 20. Execution of a game, as the expression is used above, refers to control of the display on the monitor screen 11 of the TV receiver 10 connected to the entertainment apparatus 2, and control of the progress of the game, in response to instructions from the player received via the controller 20. The memory cards 26 installed in the memory card slots 8A and 8B have stored in them various game data, generated by the execution and storage of video games, thereby enabling continued play of a game in progress using this game data.

Additionally, the above-noted entertainment apparatus 2 not only executes a video game based on a game application program, but also, for example, can be used to play back (decode) audio data stored on a CD, or video and audio data (such as for a movie or the like) stored on a DVD, as well as for other operations, based on a variety of application programs.

General Description of the Controller

While the detailed internal circuit configuration of the controller 2 will be presented later, the main constituent elements of the controller as part of the present invention are a communication circuit and an antenna for bi-directional wireless communication with the transceiver 27 (a function previously referred to as a communication device), and a connector 44. The connector 44 is a connector having a connection part 45 which is electrically connected only at the time of communication specification information exchange with the transceiver 27. The connector 44, however, is not used at the time of actual execution of a game (that is, it is not used when performing bi-directional wireless communication during a game).

The controller 20 has a left grip 35 which is gripped and held within the palm of the left hand of the operator (player); a right grip 36 which is gripped and held within the palm of the right hand of the operator (player); a left operating part 21 and a right operating part 22 which are each operated by the thumbs of the left and right hands, respectively, when the grips 35 and 36 are gripped by the left and right hands of the player, respectively; a left analog operating part 31 and a right analog operating part 32 which are operated as joysticks, respectively, by the left and right thumbs; a first left pushbutton 23L and a first right pushbutton 23R which are operated by pressing by the left and right index fingers, respectively; and, although not illustrated, a second left pushbutton and a second right pushbutton which are provided below the first left and right pushbuttons 23L and 23R, respectively, and which are operated by the middle fingers of the left and right hands, respectively.

The left operating part 21 is provided with "up", "down", "left" and "right" direction keys used, for example, when a player moves a character on the screen. The "up", "down", "left" and "right" direction keys are used not only to issue up, down, left, and right direction commands, but can also be used for issuing commands for an oblique direction. For example, if the up key and the right key are pressed simultaneously, it is possible to issue a command for the upper-right direction. The same is true of the other direction keys. For example, if the down direction key and the left direction key are pressed simultaneously, a command is given for the lower-left direction.

The right operating part 22 has four command buttons (these buttons being respectively marked by engraved Δ, □, X, and O marks), to which different functions are assigned by a game application program. For example, a menu item selection function is assigned to the Δ button, a cancel function for canceling a selected item is assigned to the X button, a specification function for establishing selected items is assigned to the O button, and a function for specifying display or non-display of a table of contents or the like is assigned to the □ button.

When they are not operated so as to impart an inclination thereto, the left analog operating part 31 and the right analog operating part 32 are held in the vertical attitude condition in which they are not inclined from the vertical (reference position), and when they are operated so as to impart an inclination thereto, coordinate values on an XY coordinate system are detected in response to the amount of inclination with respect to the reference position and the direction of the inclination, these coordinate values being sent to the entertainment apparatus 2 as the operation output.

The controller 20 is further provided with a mode selection switch 33 for the purpose of operating a function of the left and right operating parts 21 and 22 or the left and right analog operating parts 31 and 32 (analog operating mode), or for stopping the operation (digital operating mode), a flashing indicator 34 for notifying a player, for example by an LED (light-emitting diode) or the like, of the selected operating mode, a start button for giving commands for starting a game or starting and stopping a game or playback, and a selector button for causing display of a menu or the operating panel on the monitor screen 11. If the mode selection switch 33 is used to select the analog operating mode, the flashing indicator 34 is controlled so as to flash, and the left and right analog operating parts 31 and 32 become operative, but if the digital operating mode is selected, the flashing indicator 34 is extinguished and operation of the left and right analog operating parts 31 and 32 is disabled.

When the various buttons and operating parts provided on the controller 20 are operated, the controller 20 generates an operating signal corresponding to the operation, this operating signal being sent to the video game machine 2 by wireless communication via the transceiver 27.

In addition, controller 20 is provided within the left and right grips with a vibration generating mechanism which generates a vibration in response to a command from the entertainment apparatus 2, for example by causing a weight that is eccentrically disposed with respect to a motor to rotate. That is, there is a function that, by causing the vibration generating mechanism to operate, imparts vibration to the hand of the player.

General Description of the Transceiver

Although a detailed description of the internal circuit configuration of the transceiver 27 is presented later, the main constituent elements of the transceiver 27 are a communication circuit for the purpose of performing bi-directional communication with the entertainment apparatus 2, and a communication circuit and antenna (previously referred to as a communication device) for performing bi-directional wireless communication with the controller 20, in addition to connectors 41 and 42. The connector 41 is inserted into either controller port 7A or 7B of the entertainment system 2 so as to make an electrical connection therewith, in which connected condition bi-directional communication is performed with the entertainment apparatus 2. The connector 42 has a connection part 43 that makes an electrical connection with the controller 20 only when the above-described exchange of communication specification information is performed. The connector 42, however, is not used at the time of actual execution of a game (that is, it is not used when performing bi-directional wireless communication during a game).

Bi-directional wireless communication is performed between the transceiver 27 and the controller 20 by, for example, a general-purpose short-range high-speed communication system, such as one using infrared signals or the BlueTooth (trademark) system, or by a dedicated short-range wireless communication system used to perform either one-to-one communication or one-to-many communication.

Processing for Exchange of Communication Specification Information in the Entertainment System of FIG. 15

Figure 16:
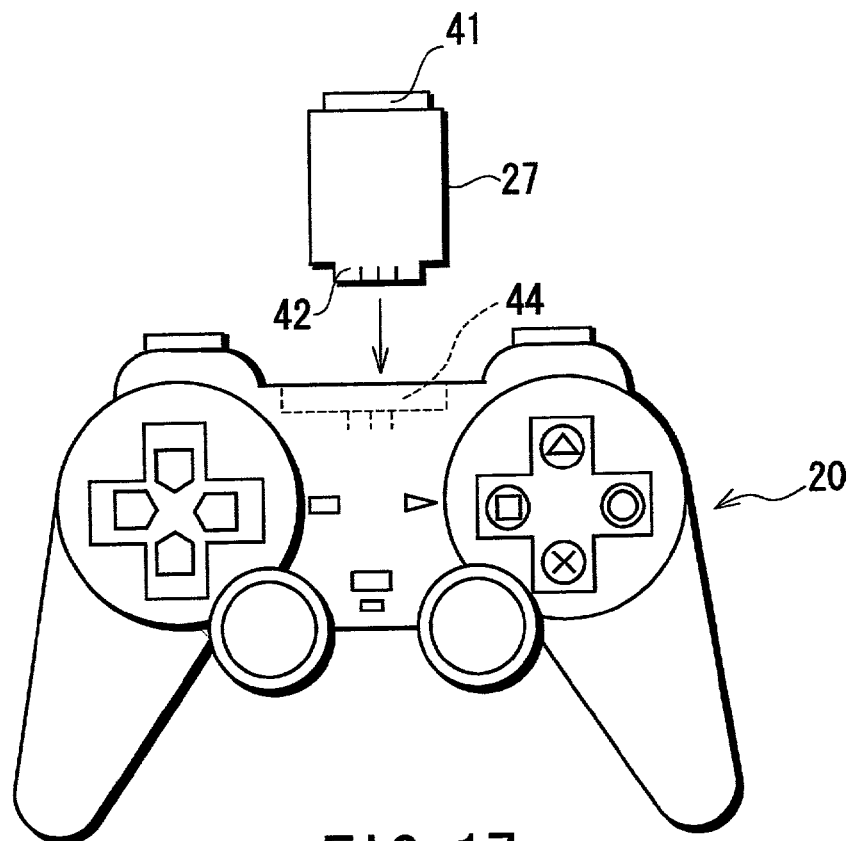
FIG. 16 is a drawing illustrating the condition immediate prior to connection between a controller and a transceiver.
Figure 17:
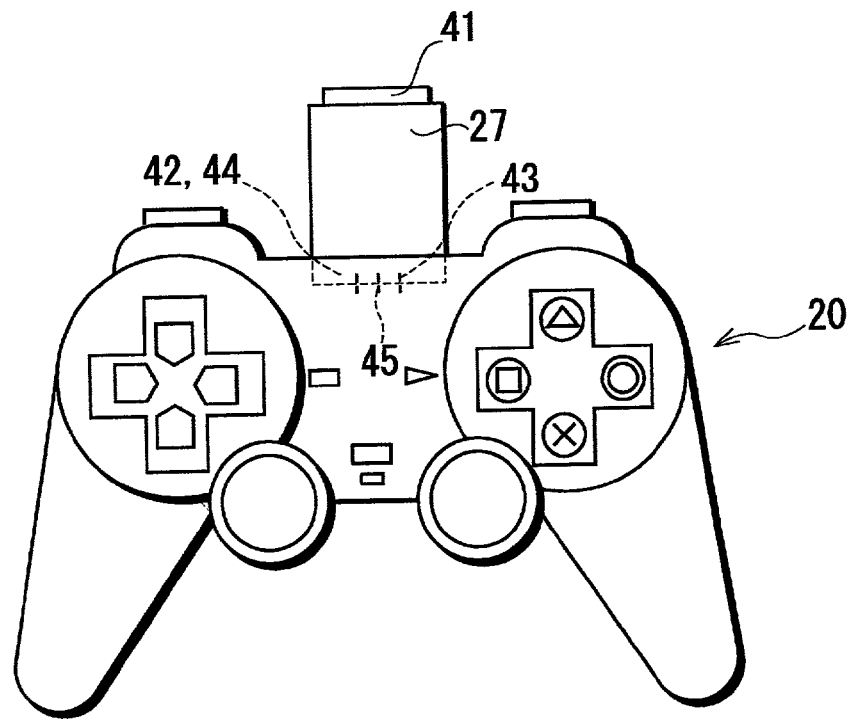
FIG. 17 is a drawing showing the condition of the controller connected to the transceiver.

In the entertainment system shown in FIG. 15, in the case in which communication specification information is to be exchanged as described earlier between the controller 20 and the transceiver 27, first, as shown in FIG. 16 and FIG. 17, the connector 42 provided on the transceiver 27 is inserted, for example, into the connector 44 provided between the first and second left pushbuttons and the first and second right pushbuttons, the connection parts 45 and 43 of the connectors 44 and 42, respectively, making contact (electrical connection). In this condition, the communication specification information is exchanged between the transceiver 27 and the controller 20. The flow of exchange of the communication specification information is the same as described with reference to FIG. 2, the two communication devices in FIG. 2 corresponding to the transceiver 27 and the controller 20.

After completion of the communication specification information exchange processing, the electrical connection between the connector 42 of the transceiver 27 and the connector 44 of the controller 20 is broken.

By doing the above in the entertainment system of FIG. 15, it is possible to perform one-to-one communication between the transceiver 27 and the controller 20. Thus, in this entertainment system it is possible to perform communication between the controller 20 and the entertainment apparatus 2 via the transceiver 27.

Figure 18:
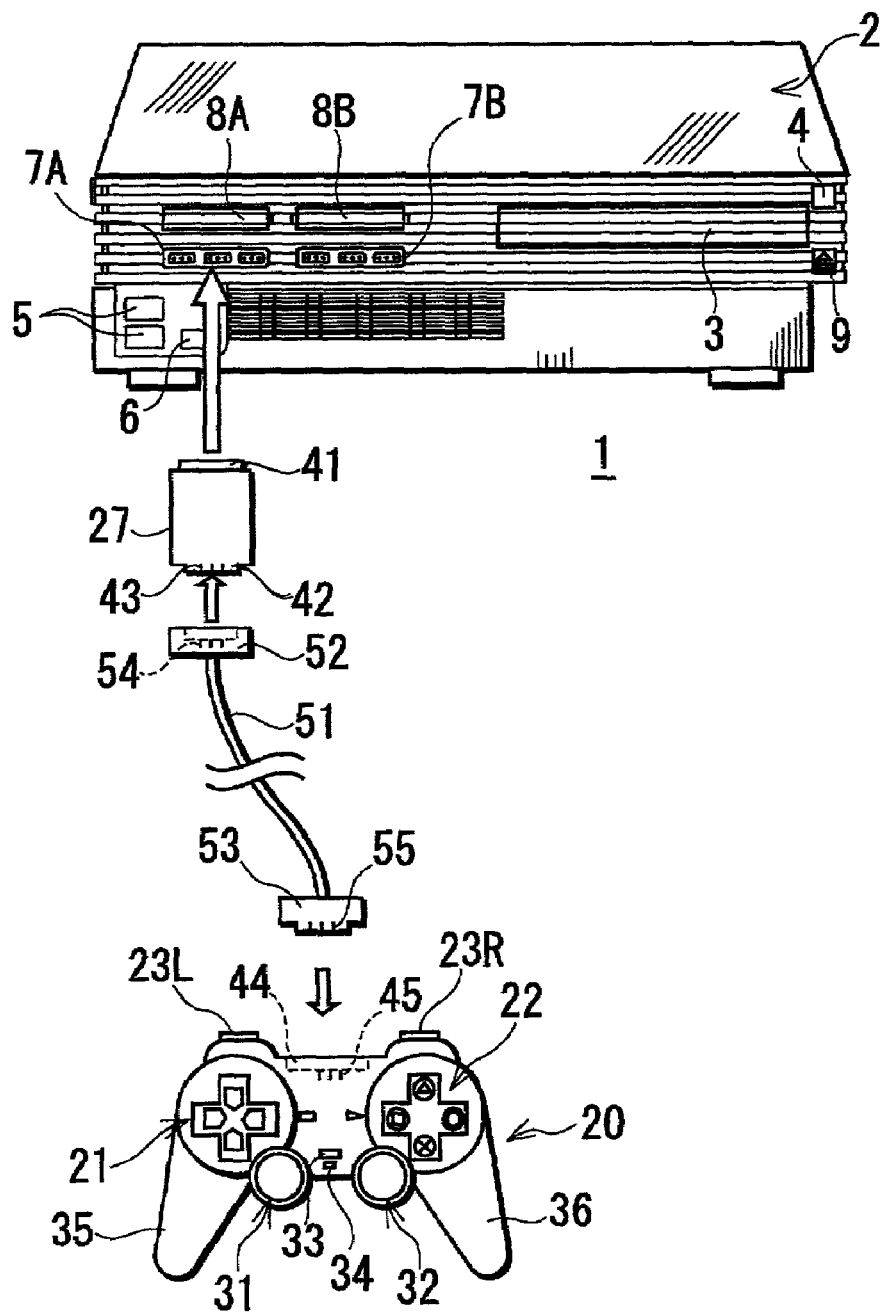
FIG. 18 is a drawing showing an example of the general system configuration in the case in which the second or third embodiment of the present invention is applied to an entertainment system.

Example of Application of the Second and Third Embodiments to an Entertainment System Turning to FIG. 18, we see an example of the general configuration of an entertainment system in which communication specification information is exchanged by an electrical connection, via a cable, such as is the case in the second embodiment and the third embodiment. The example shown in FIG. 18 is that in which the third embodiment is applied.

The entertainment system shown in FIG. 18 has, similar to FIG. 15, an entertainment apparatus 2, a controller 20, and a transceiver 27, and when the communication specification information is exchanged, a predetermined cable 51 (corresponding to the connecting cable CAex in FIG. 4) makes a connection between the transceiver 27 and the controller 20. The TV receiver is not shown illustrated.

In the entertainment system shown in FIG. 18, the predetermined cable 51 has on one end thereof a connector 52 that is connectable to the connector 42 of the transceiver 27, and on the other end a connector 53 that is connectable to the connector 44 of the controller 20.

Processing for Exchange of Communication Specification Information in the Entertainment System of FIG. 18

In the entertainment system shown in FIG. 18, in the case in which communication specification information is to be exchanged between the controller 20 and the transceiver 27, the connector 53 of the predetermined connecting cable 51 is inserted into the connector 44 of the controller 20, so as to cause contacting (an electrical connection) between the connection part 45 of the connector 44 and the connection part 55 of the connector 53. In a similar manner, the connector 52 of the predetermined connecting cable 51 is inserted into the connector 42 of the transceiver 27, so as to cause contacting (an electrical connection) between the connection part 43 of the connector 42 and the connection part 54 of the connector 52. Then the communication specification information is exchanged between the transceiver 27 and the controller 20 via the connection parts 43, 54, the cable 51, and the connection parts 55, 45. The processing for the exchange of the communication specification information is similar to that described above with regard to FIG. 2, and the two communication devices of FIG. 2 correspond to the transceiver 27 and the controller 20.

After completing the communication specification information exchange, the electrical connection between the connector 42 of the transceiver 27 and the connector 44 of the controller 20, via the predetermined cable 51, is broken.

By doing the above, in the entertainment system of FIG. 18 it is possible to perform one-to-one communication between the transceiver 27 and the controller 20. Thus, it is possible in this entertainment system for the controller 20 and the entertainment apparatus 2 to perform communication via the transceiver 27.

Example of Application to an Entertainment apparatus 2 of the Fourth Embodiment

Figure 19:
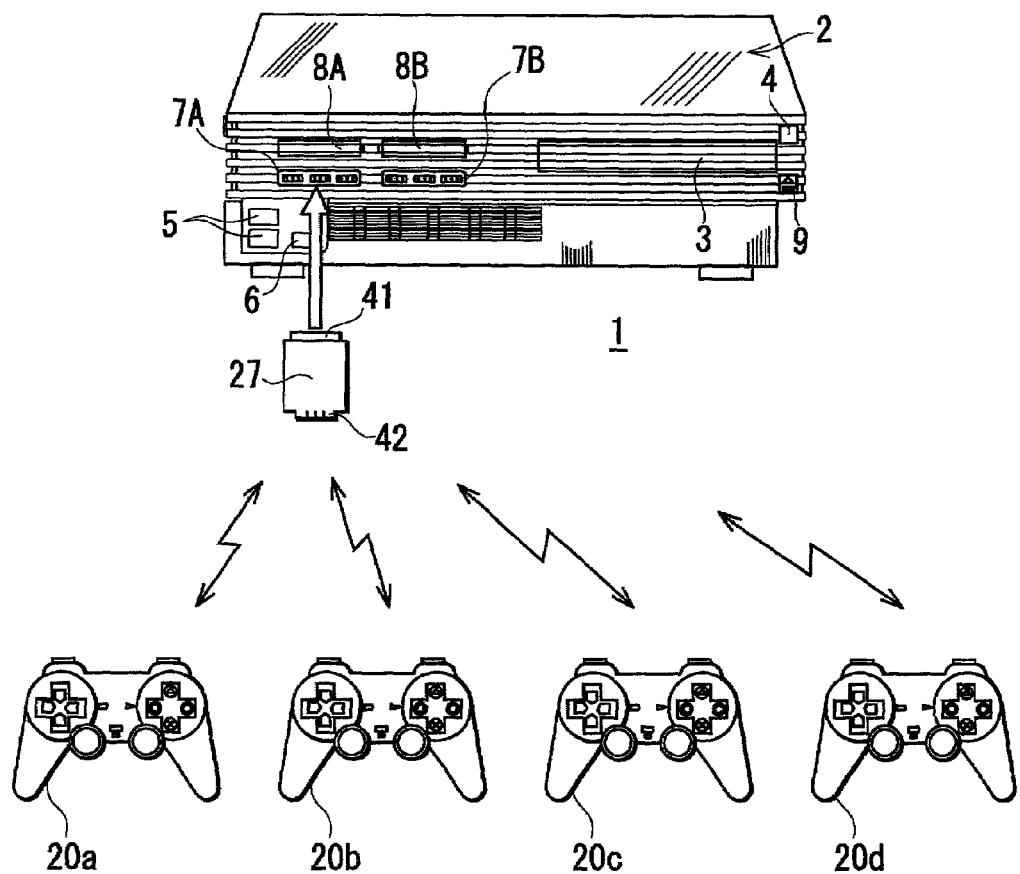
FIG. 19 is a drawing showing an example of the general configuration in the case in which the fourth embodiment of the present invention is applied to an entertainment system.

FIG. 19 shows an example of the general configuration of an entertainment system in which communication specification information is exchanged between each communication device for the purpose of one-to-many communication between a plurality of communication devices, as in the case in the above-described fourth embodiment. In this drawing, the TV receiver has not been shown.

The entertainment system shown in FIG. 19 has an entertainment apparatus 2, a controller 20, and a transceiver 27, similar to the examples of FIG. 15 and FIG. 18. In this case, however, there are a plurality of controllers 20 (the four controllers 20a to 20d in this example), and it is possible for the transceiver 27 to perform one-to-many (one-to-four) communication with the controllers 20a to 20d.

In the entertainment system shown in FIG. 19, when exchanging communication specification information, either electrical connections are sequentially made between the connector 42 of the transceiver 27 and the connector 44 of each of the controllers 20a to 20d, as in the example of FIG. 15 or, as shown in FIG. 18, these connections are sequentially made via a predetermined connecting cable 51. In this example, the processing for exchange of communication specification information is similar to the case shown in FIG. 7. In this example, the transceiver 27 corresponds to the communication device A in FIG. 5 to FIG. 7, and the controllers 20a to 20d correspond to the communication devices B to E, and minimally the transceiver 27 has a buffer for holding the communication specification information of the controllers 20a to 20d, as described above.

After completion of the exchange of the communication specification information, in the entertainment system of FIG. 19, it is possible to perform one-to-many communication between the transceiver 27 and the controllers 20a to 20d. Thus, in this entertainment system, it is possible to perform communication between the entertainment apparatus 2 and the four controllers 20a to 20d via the transceiver 27.

Example of Application to an Entertainment System of the Fifth to Seventh Embodiments FIG. 20 shows an example of the general configuration of an entertainment system, in which communication specification information is exchanged between each of the communication devices via a relay station, as in the fifth embodiment to the seventh embodiment described above. The particular example shown in FIG. 20 is one in which the seventh embodiment is applied. The TV receiver is not illustrated.

The entertainment system shown in FIG. 20 has an entertainment apparatus 2, a controller 20, and a transceiver 27, as described above. In this case, however, there are two transceivers 27 (transceiver 27A and 27B) connected to two controller ports (7A and 7B) of the entertainment apparatus 2. The two transceivers 27A and 27B correspond to the primary communication devices in the sixth embodiment. A plurality of controllers 20 exist (in this example, the 8 controllers 20a to 20d and 20e to 20h), of which the four controllers 20a to 20d perform one-to-many communication with the transceiver 27A and the remaining 4 controllers 20e to 20h perform one-to-many communication with the transceiver 27B. These 8 controllers, 20a to 20d and 20e to 20h, correspond to the second communication devices in the sixth embodiment. Additionally, in the entertainment system shown in FIG. 20, the entertainment apparatus 2 corresponds to the relay station TE. Thus, the transceivers 27A and 27B in this example generate a number of communication specification information corresponding to the number of controllers with which each of them can communicate, and, if necessary, they store this communication specification information into a buffer. The entertainment apparatus 2 has a buffer for storage of communication specification information generated by the transceivers 27A and 27B.

In the entertainment system shown in FIG. 20, when exchanging communication specification information, either an electrical connection is made sequentially between the connector 42 of either transceiver 27A or 27B and each of the connectors 44 of the controllers 20a to 20d and 20e to 20h, as shown in FIG. 15, or the electrical connections are sequentially made via a predetermined connecting cable 51, as shown in FIG. 18. In this example, the processing for exchange of communication specification information is similar to that shown in FIG. 11 to FIG. 13.

After completion of exchange of communication specification information, in the entertainment system of FIG. 20, the transceivers 27A and 27B can perform one-to-many communication with the controllers 20a to 20d, and 20e to 20h. That is, in this entertainment system, it is possible for the entertainment apparatus 2 to perform communication with the controllers 20a to 20d and 20e to 20h via the transceivers 27A and 27B.

In the case of an entertainment system such as shown in FIG. 20, each individual transceiver 27 performs one-to-many communication with four controllers 20. For this reason, when exchanging the communication specification information, it is basically necessary to sequentially make connections of four controllers, in the groups 20a to 20d and 20e to 20h, with each of the transceivers 27A and 27B. In the case of this entertainment system, however, because the users are often children, it can be envisioned that they would not understand the communication correspondence relationship between each of the transceivers 27A and 27B and the four each of the controllers 20a to 20d and 20e to 20h when they perform the task of making the above-noted sequential electrical connections for exchanging communication specification information. Therefore, in an entertainment system such as shown in FIG. 20, as described with regard to the sixth embodiment, the entertainment apparatus 2 is caused to operate as the relay station TE with each of the communication specification information being stored into a buffer of the entertainment apparatus 2. When there is an electrical connection between the transceivers 27A and 27B (primary communication devices) and each of the controllers 20a to 20d and 20e to 20h (second communication devices), by exchanging information using the communication specification information stored by the entertainment apparatus 2 at the time of communication specification information regardless of which transceiver 27A and 27B is connected to each of the controllers 20a to 20d and 20e to 20h, it is possible for the transceivers 27A and 27B to each perform one-to-many communication with four controllers, these being controllers 20a to 20d and 20e to 20h, respectively.

Internal Circuit Configuration of Individual Elements of the Entertainment System The internal circuit configurations of the entertainment apparatus 2, the transceivers 27 (27A and 27B), and the controllers 20 (20a to 20h) used in the above-described entertainment system are described below.

Internal Circuit Configuration of the Entertainment Apparatus 2

Figure 21:
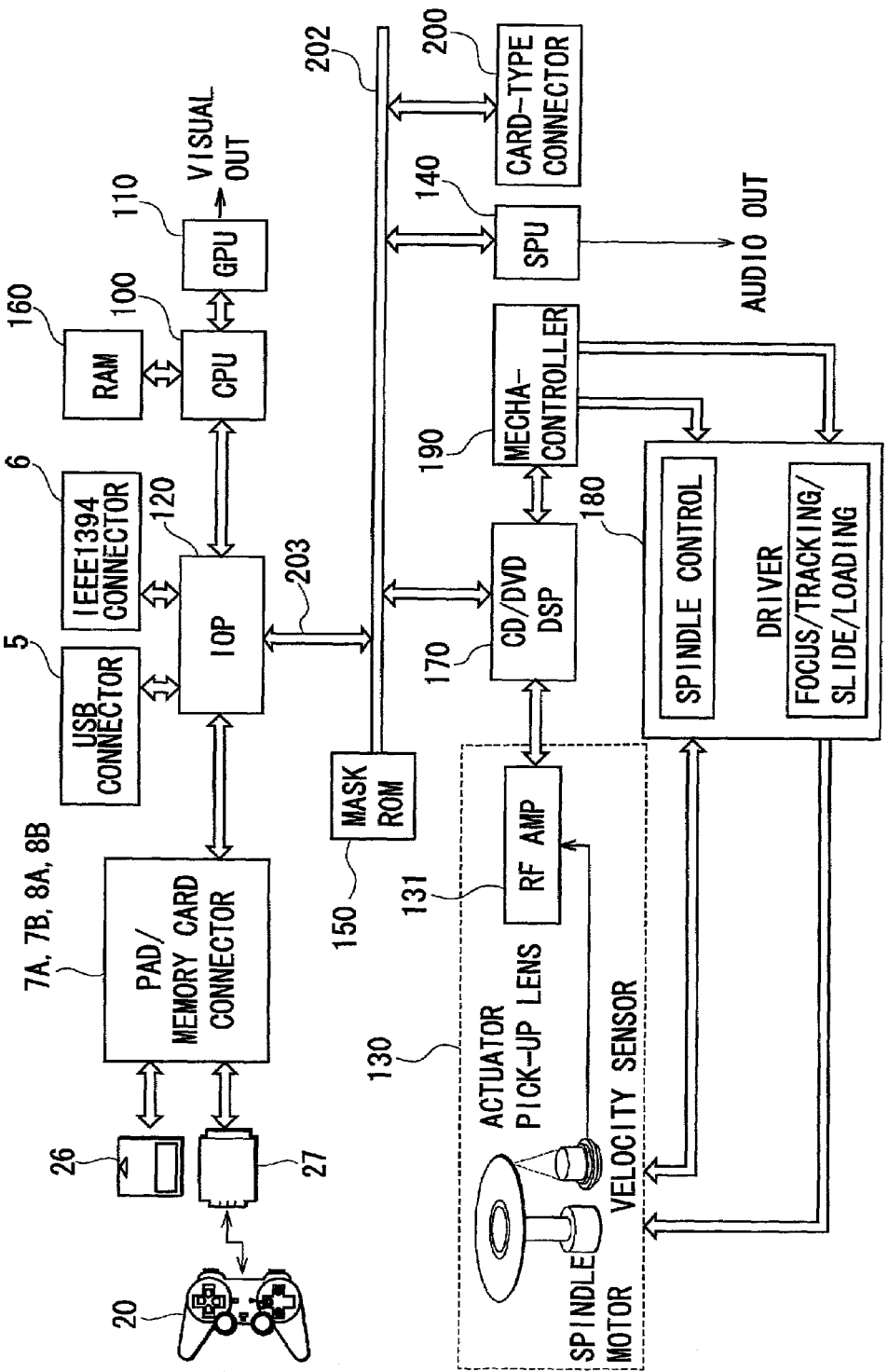
FIG. 21 is a block diagram showing the internal circuit configuration of an entertainment system.

FIG. 21 shows the internal circuit configuration of the entertainment apparatus 2.

The entertainment apparatus 2 has, for example, a main CPU 100 which controls signal processing and internal constituent elements based on various programs such as game application programs; a graphic processing unit (GPU) 110 which performs image processing; an IO processor (IOP) 120 which operates under control of a communication specification information exchange program for the purpose of executing the exchange of communication specification information described above with regard to the various embodiments, communicates with the above-noted transceiver 27 and with a memory card 26, and performs interface processing between the apparatus and the outside; an optical disc playback section 130 which performs playback of a DVD or CD or the like onto which is recorded an application program or multi-media contents; a main memory 160 which includes functions of a working area for the main CPU 100 and a buffer for temporary storage of data read out from an optical disc; a MASK-ROM 150 into which is mainly stored an operating system program executed by the main CPU 100 and the IO processor 120; and a sound processor unit (SPU) 140 which performs audio signal processing.

The entertainment apparatus 2 has a CD/DVD digital signal processor (DSP) 170 which performs playback by performing error correction processing (CIRC processing) and expansion and the like with respect to compressed data and playback of the output of a CD or DVD supplied by the optical disc playback section 130 and an RF amplifier 131; a driver 180 and mechanism controller 190 which control a spindle motor of the optical disc playback section 130, focus and tracking control of an optical disc pickup, and directory loading control and the like; and a card-type connector (for a PC card slot) 200 for connection of, for example, a communication card or external hard disk drive or the like.

These various elements are mutually connected via bus lines 202 and 203 or the like. The connection between the main CPU 100 and the graphic processor unit 110 is made by a dedicated bus, and the connection between the main CPU 100 and the IO processor 120 is made by SBUS. The connection between the IO processor 120 and the CD/DVD digital signal processor 170, the MASK-ROM 150, the sound processor unit 140, and the card-type connector 200, is made by SBUS.

The main CPU 100, by executing an operating system program for the main CPU stored in the MASK-ROM 150, controls the overall operation of the entertainment apparatus 2. The main CPU 100, by executing various application programs, including a game application program, for example, read out from a CD-ROM or DVD optical disc and loaded into the main memory 160, or downloaded via a communication network, also controls a game or the like in the entertainment apparatus 2.

The IO processor 120, by executing an IO processor operating system stored in the MASK-ROM 150, performs such tasks as input and output of a signal from the controller 20 in response to operation by a player or data from the memory card, into which is stored game settings, in addition to input and output of data with a USB controller controlling the signal transmitting and receiving of the USB connector 5, data input with the IEEE 1394 controller which controls the transmitting and receiving of signals at the IEEE 1394 connector 6, control of data input and output at the PC card slot, and control of data conversion. The IO processor 120, in accordance with an information exchange program for executing exchange of communication specification information, as described above, performs such tasks as communication with the transceiver 27 connected to the controller ports 7A and 7B, communication with the controller 20 via the transceiver 27, operation as the relay station TE, and writing to and reading from an internal buffer.

The MASK-ROM 150 is capable of storing device IDs for such elements as a memory card 26 connected to the memory slots 8A and 8B, and a PC card connected to the card-type connector (PC card slot) 200, and the IO processor performs communication with the above-noted memory card and the like based on these device IDs.

The graphic processor unit 110 performs plotting in accordance with plotting instructions from the main CPU 100, and plotted images are stored in a frame buffer (not shown in the drawing) The graphic processor unit 110 also functions as a geometry transfer engine which performs processing such as coordinate conversion. That is, the graphic processor unit 110, in serving as a geometric transfer engine, in the case in which an application program such as a game stored on an optical disc uses so-called 3-dimensional graphics, has virtual 3-dimensional objects which are formed by triangular polygons. It also performs calculations for generating images of these 3-dimensional objects obtained by imaging by a virtual camera, that is, the perspective conversion for rendering (calculations of coordinate conversions for the case in which the vertices of each polygon making up a 3-dimensional object are projected onto a virtual screen) The graphic processor unit 110, in accordance with plotting instructions from the main CPU 100, generates images by performing rendering of 3-dimensional objects with respect to the frame buffer, while making use, when necessary, of the geometry transfer engine. The graphic processor unit 110 outputs a video signal responsive to these generated images.

The sound processor unit 140 has functions such as an ADPCM function for generating predictive adaptive audio data, a playback function for playing back waveform data stored in an internal sound buffer within the unit 140 or external sound buffer (not shown in the drawing), so as to play back the audio signal of sound effects and the like, and a modulation function for modulating and playing back waveform data stored in the sound buffer. By providing such functions, the sound processor unit 140 is configured so that, based on instructions from the main CPU 100, it plays back an audio signal of music and sound effects of waveform data stored in the sound buffer, and can be used as a so-called sampling sound source.

In an entertainment system 2 having the above-noted configuration, when, for example, the power supply is switched on, an operating system program for the main CPU 100 and an operating system program for the IO processor 120 are each read out of the MASK-ROM 150, and the main CPU 100 and the IO processor 120 execute these respective operating system programs. By doing this, the main CPU 100 performs overall management of the various parts of the entertainment apparatus 2. The IO processor 120 also controls input and output with the transceiver 27 and controller 20 via the transceiver, and input and output with the memory card 26. When the main CPU 100 executes the operating system program, after performing initialization processing, such as verification of operation conditions, the main CPU 100 controls the optical disc playback section 130 so as to read out an application program, such as a game program stored on an optical disc and, after loading into the main memory 160, executes the game application program. By executing this game application program, the main CPU 100, in response to instructions from the player, received from the controller 20 via the ITO processor 120, controls the graphic processor unit 110 and the sound processor unit 140 so as to control image display and playback of sound effects, music and the like. In the entertainment system 2 according to this embodiment, the case in which playback is done of images or the like stored on an optical disc is similar, the main CPU 100 performing control of the graphic processor unit 110 and the sound processor unit 140 in accordance with the instructions (commands) received from the controller 20 via the IO processor 120 so as to control image display and control playback of sound effects, music and the like.

Internal Circuit Configuration of the Transceiver

Figure 22:
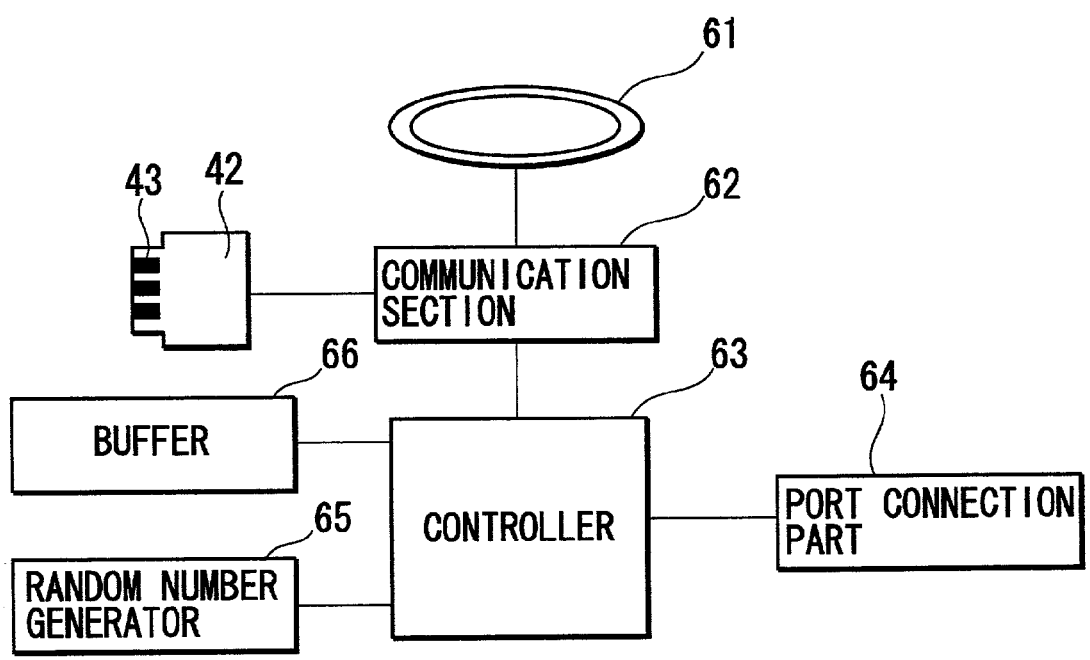
FIG. 22 is a block diagram showing the internal circuit configuration of a transceiver.

FIG. 22 shows the internal circuit configuration of the transceiver 27.

The transceiver 27 shown in FIG. 22 has a port connection part 64 for making electrical connection to and performing bi-directional communication with the controller port 7A or 7B of the entertainment apparatus 2; a transceiver 61 having an antenna for performing bi-directional communication with the controller 20 or a light-emitting/light-receiving element for performing infrared communication with the controller 20; and a communication section 62 for performing communication with regard to a signal sent to and received from the controller 20 and communication specification information exchanged with the controller 20 via the connector 42. The transceiver 27 has, if necessary, a buffer 66 for holding the communication specification information, a random number generator 65 for generating a random number, for example, the communication specification information, and a controller 63 for performing operational control of various parts and control of communication. In the case in which the transceiver 27 does not hold the communication specification information, such as in the seventh embodiment, it is not absolutely necessary to have the buffer 66.

In the transceiver 27, the controller 63 is made up, for example, by a CPU, a RAM, and a ROM. A control program for controlling the operation of the transceiver 27 and a communication program or the like for performing processing for communication with the entertainment apparatus 2 and communication with the controller 20 are stored in the ROM, the internal CPU performing control in accordance with these programs.

The operation of the present invention is such that when the controller 63 detects that there is an electrical connection between the connector 42 and the connection part 45 of the connector 44 of the controller 20, for example by detection of a change in potential of a connection part 43 of the connector 42, the information exchange processing described above with reference to FIGS. 2 and 7, for example, starts, and further the random number (communication specification information) is caused to be generated from the random number generator 65, the random number being stored in the buffer 66.

After completion of the above information exchange processing, the controller 63 performs wireless communication with the controller 20 via the transceiver 61 and the communication section 62, and also performs communication with the entertainment apparatus 2 via the port connection part 64.

Internal Circuit Configuration of the Controller

Figure 23:
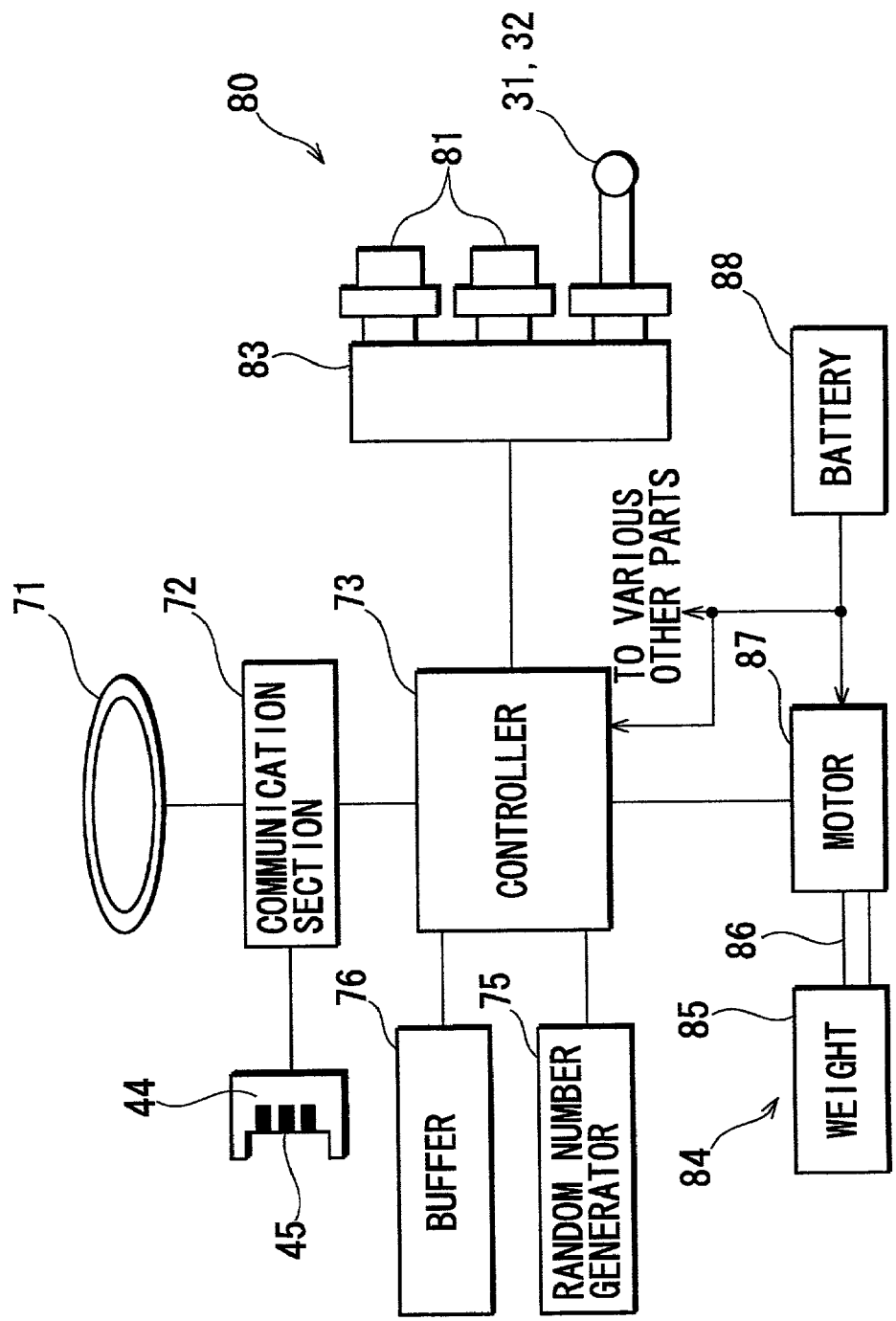
FIG. 23 is a block diagram showing the internal circuit configuration of a controller.

FIG. 23 shows the internal circuit configuration of the controller 20 having the above-noted wireless communication function.

The controller 20 shown in FIG. 23 has a transceiver 71 with an antenna for performing bi-directional wireless communication with the transceiver 27, or a light-emitting/light-receiving element or the like for performing infrared communication with the transceiver 27; and a communication section 72 which performs processing of communication with regard to signals sent to and received from the transceiver 27, and communication specification information that is exchanged with the transceiver 27 via the connector 44. The controller 20 also has a buffer 76 that, if necessary, holds the communication specification information; a random number generator 75 which generates the communication specification information as, for example, a random number; and a controller 73 which controls the operation of various elements and communication. In addition, the controller 20 has an operation module 80 which is formed by various operating buttons 81 and analog operating parts 31 and 32, operated by a player; a vibration generating module 84 which generates a vibration by causing rotation of a weight 85 that is eccentric with respect to a motor 87; and a battery 88 which supplies electrical power to the motor 87 and various other parts.

In the controller 20, the controller 73 is made up, for example, of a CPU, a ROM, and a RAM. In the ROM are stored a detection program for detecting the input condition of the various buttons 81 and analog operating parts 31 and 32, a control program for controlling the operation of the motor 87 of the vibration generating module 84, and a communication program for processing of communication with the transceiver 27, the internal CPU performing control of various parts in accordance with these programs. The control operation of the present invention is such that when the controller 20, by detecting a change in potential, for example, at the connection part 45 of the connector 44, detects that there is an electrical connection of the connector 44 with the connection part 43 of the connector 42 of the transceiver 27, processing of information exchange is started in accordance with the flowcharts shown as FIG. 2 and FIG. 7, for example, and further a random number is generated from the random number generator 75 and held in the buffer 76.

After the completion of the above-noted information exchange, the controller 73 performs wireless communication with the transceiver 27 via the transceiver 71 and the communication section 72.

Although the foregoing description was for the case in which the present invention is applied to an entertainment system formed by a entertainment apparatus 2, a transceiver, and a controller, it will be understood that the embodiments of the present invention can be applied to wireless communication systems other than these entertainment systems.

Finally, it should be noted that the foregoing embodiments are merely exemplary forms of the present invention, to which the present invention is not restricted, and that the present invention can take other various forms, within the scope of the technical concept thereof, but different from the foregoing described embodiments.

For example, application is alternatively possible to a remote control system for various electronic equipment, such as a video game receiver, a VCR (video cassette recorder), or a video disc apparatus. That is, the use of an infrared controller for transmitting commands using infrared is well known as a remote control terminal for a TV receiver or VCR, wherein there is basically a one-to-one relationship between the infrared controller and the TV receiver or the like, the normal case being that in which a single infrared controller operates one TV receiver or the like. As long as the operating commands sent and received between the infrared controller and the TV receiver or the like are the same, it is possible, for example, to have a plurality of infrared controllers perform wireless communication remote control operation of a single TV receiver or the like, so that by applying various embodiments of the present invention to a remote control system for this video game, it is possible to have a plurality of infrared controllers perform wireless remote control of a video game or the like without incurring interference therebetween.

The invention claimed is:

1. A method of exchanging information between devices to permit subsequent wireless communication between the devices, said method comprising:

establishing a primary electrical connection between a first primary device and a second primary device;

generating a first number of communication specification information portions at the first primary device and a second number of communication specification information portions at the second primary device, each of the first number of communication specification information portions including information that is to be included in subsequent wireless communication between the first primary device and a given secondary device, each of the second number of communication specification information portions including information that is to be included in subsequent wireless communication between the second primary device and another given secondary device;

associating a specific one of the first number of communication specification information portions with each one of a first plurality of secondary devices when the number of devices in the first plurality of secondary devices does not exceed the first number, the first primary device thereby being operable to carry out wireless communication with each one of the first plurality of secondary devices;

associating a specific one of the first number of communication specification information portions with each one of a first portion of the first plurality of secondary devices when the number of devices in the first plurality of secondary devices exceeds the first number, the first primary device thereby being operable to carry out wireless communication with each one of the first portion of the first plurality of secondary devices;

associating a specific one of the second number of communication specification information portions with each one of a second plurality of secondary devices when the number of devices in the second plurality of secondary devices does not exceed the second number, the second primary device thereby being operable to carry out wireless communication with each one of the second plurality of secondary devices;

sending, from the first primary device via the primary electrical connection when the number of devices in the first plurality of secondary devices exceeds the first number, an inquiry as to whether any of the second number of communication specification information portions is not associated with one of the second plurality of secondary devices; and associating a further specific one of the second number of communication specification information portions with at least one of a second portion of the first plurality of secondary devices when that communication specification information portion is not associated with one of the second plurality of secondary devices, the second primary device thereby being further operable to carry out wireless communication with the at least one of the second portion of the first plurality of secondary devices.

2. The method according to claim 1, wherein each of the first number of communication specification information portions includes identification information identifying a characteristic of the first primary device, and each of the second number of communication specification information portions includes identification information identifying a characteristic of the second primary device.

3. The method according to claim 1, wherein each of the first number of communication specification information portions and each of the second number of communication specification information portions includes an associated predetermined password.

4. The method according to claim 3, wherein the predetermined password includes a random number.

5. The method according to claim 1, wherein each of the first number of communication specification information portions includes information indicating a communication frequency to be used during the subsequent wireless communication between the first primary device and the given secondary device, and each of the second number of communication specification information portions includes information indicating a communication frequency to be used during the subsequent wireless communication between the second primary device and the another given secondary device.

6. The method according to claim 1, wherein each of the first number of communication specification information portions includes information indicating a wireless channel to be used during the wireless communication between the first primary device and the given secondary device, and each of the second number of communication specification information portions includes information indicating a wireless channel to be used during the wireless communication between the second primary device and the another given secondary device.

7. The method according to claim 1, further comprising:
establishing a plurality of successive secondary electrical connections, one at a time, between the first primary device and each one of the first plurality of secondary devices when the number of devices in the first plurality of secondary devices does not exceed the first number;
establishing a plurality of successive secondary electrical connections, one at a time, between the first primary device and each one of the first portion of the first plurality of secondary devices when the number of devices in the first plurality of secondary devices exceeds the first number; and
said step of associating a specific one of the first number of communication specification information portions with each one of a first plurality of secondary devices includes sending, from the first primary device to each one of the first plurality of secondary devices via its corresponding secondary electrical connection, the specific one of the first number of communication specification information portions, and
said step of associating a specific one of the first number of communication specification information portions with each one of a first portion of the first plurality of secondary devices includes sending, from the first primary device to each one of the first portion of the first plurality of secondary devices via its corresponding secondary electrical connection, the specific one of the first number of communication specification information portions.

8. The method according to claim 1, wherein said establishing step includes:
providing a relay station,
establishing a first electrical connection between the first primary device and the relay station, and
establishing a second electrical connection between the second primary device and the relay station; and
said sending step includes sending the inquiry from the first primary device to the second primary device via the first electrical connection, the relay station, and the second electrical connection or to the relay station via the first electrical connection.

9. The method according to claim 8, said step of associating a further specific one of the second number of communication specification information portions with at least one of a second portion of the first plurality of secondary devices includes:
receiving, at the first primary device, the further specific one of the second number of communication specification information portions from the second primary device or from the relay station;
sending the further specific one of the second number of communication specification information portions from the first primary device to the at least one of the second portion of the first plurality of secondary devices via a secondary electrical connection; and
notifying the second primary device that the further specific one of the second number of communication specification information portions has been associated with the at least one of the second portion of the first plurality of secondary devices.

10. The method according to claim 8, further comprising:
storing the communication specification information portion associated with the at least one of the second portion of the first plurality of secondary devices in the relay station.

11. The method according to claim 7, further comprising:
verifying, at the first primary device, that the specific one of the first number of communication specification information portions has been correctly received by that secondary device.

12. The method according to claim 7, further comprising:
removing the secondary electrical connection prior to initiating the wireless communication between the first primary device and a particular one of the first plurality of secondary devices or a particular one of the first portion of the first plurality of secondary devices.

13. The method according to claim 7, further comprising:
sending a first random number from the first primary device to a particular one of the first plurality of secondary devices via the corresponding secondary connection;
receiving, at the first primary device, a second random number from the particular one of the first plurality of secondary devices; and
verifying, at the first primary device, that the first random number is identical to the second random number.

14. The method according to claim 1, wherein said step of associating the specific one of the communication specification information portions stored at the second primary device with the at least one of a second portion of the first plurality of secondary devices includes:
associating a specific one of the communication specification information portions stored at the second primary device with each one of the second portion of the first plurality of secondary devices when the sum of the number of devices in the second plurality of secondary devices and the number of devices in second portion of the first plurality of secondary devices does not exceed the second number.

15. A system for exchanging information between devices to permit subsequent performance of wireless communication between the devices, the system comprising:
a first primary device;
a second primary device; and
a primary connection unit operable to provide an electrical connection between said first primary device and said second primary device;
said first primary device including:
a generating unit operable to generate a first number of communication specification information portions each including information that is to be included in subsequent wireless communication between said first primary device and given secondary device, and
an associating unit operable to associate a specific one of the first number of communication specification information portions with each one of a first plurality of secondary devices when the number of devices in the first plurality of secondary devices does not exceed the first number, the first primary device thereby being operable to carry out wireless communication with each one of the first plurality of secondary devices, and to associate a specific one of the first number of communication specification information portions with each one of a first portion of the first plurality of secondary devices when the number of devices in the first plurality of secondary devices exceeds the first number, the first primary device thereby being operable to carry out wireless communication with each one of the first portion of the first plurality of secondary devices; and said second primary device including:

a generating unit operable to generate a second number of communication specification information portions, each of the second number of communication specification information portions including information that is to be included in subsequent wireless communication between the second primary device and another given secondary device, and an associating unit operable to associate a specific one of the second number of communication specification information portions with each one of a second plurality of secondary devices when the number of devices in the second plurality of secondary devices does not exceed the second number, the second primary device thereby being operable to carry out wireless communication with each one of the second plurality of secondary devices;

said first primary device further including:

a sending unit operable to send an inquiry as to whether any of the second number of communication specification information portions is not associated with one of the second plurality of secondary devices said primary connection unit when the number of devices in the first plurality of secondary devices exceeds the first number; and said associating unit of said second primary device being further operable to associate a further specific one of the second number of the communication specification information portions with at least one of a second portion of the first plurality of secondary devices when that communication specification information portion is not associated with one of the second plurality of secondary devices, the second primary device thereby being further operable to carry out wireless communication with the at least one of the second portion of the first plurality of secondary devices.

16. The system according to claim 15, wherein each of the first number of communication specification information portions includes identification information identifying a characteristic of the first primary device, and each of the second number of communication specification information portions includes identification information identifying a characteristic of the second primary device.

17. The system according to claim 15, wherein each of the first number of communication specification information portions and each of the second number of communication specification information portions includes an associated predetermined password.

18. The system according to claim 17, wherein the predetermined password includes a random number.

19. The system according to claim 15, wherein each of the first number of communication specification information portions includes information indicating a communication frequency to be used during the subsequent wireless communication between said first primary device and the given secondary device, and each of the second number of communication specification information portions includes information indicating a communication frequency to be used during the subsequent wireless communication between said second primary device and the another secondary device.

20. The system according to claim 15, wherein each of the first number of communication specification information portions includes information indicating a wireless channel to be used during the wireless communication between said first primary device and the given secondary device, and each of the second number of communication specification information portions includes information indicating a wireless channel to be used during the wireless communication between said second primary device and the another secondary device.

21. The system according to claim 15, further comprising:

a secondary connector, operable to provide a plurality of successive electrical connections, one at a time, between said first primary device and each one of the first plurality of secondary devices when the number of devices in the first plurality of secondary devices does not exceed the first number or between the first primary device and each one of the first portion of the first plurality of secondary devices when the number of devices in the first plurality of secondary devices exceeds the first number, wherein said sending unit is operable to send, to each one of said first plurality of secondary devices or to each one of the first portion of the first plurality of secondary devices via its corresponding electrical connection, the specific one of the first number of communication specification information portion.

22. The system according to claim 15, wherein said primary connection unit includes:

a relay station having a first relay station connector coupled to said first primary device to form a first electrical connection between said first primary device and said relay station, and having a second relay station connector coupled to said second primary device to form a second electrical connection between said second primary device and said relay station;

said sending unit being operable to send the inquiry to said second primary device via the first electrical connection, said relay station and the second electrical connection or to said relay station via the first electrical connection.

23. The system according to claim 22, wherein said first primary device includes a receiving unit operable to receive the further specific one of the second number of communication specification information portions from said second primary device or from said relay station, and said sending unit of said first primary device is further operable to send the further specific one of the second number of communication specification information portions to at least one of the second portion of the first plurality of secondary devices via a secondary electrical connection and to notify said second primary device that the further specific one of the second number of communication specification information portions has been associated with the at least one of the second portion of the first plurality of secondary devices.

24. The system according to claim 22, wherein said relay station is further operable to store the communication specification information portion associated with the at least one of the second portion of the first plurality of secondary devices.

25. The system according to claim 21, wherein said first primary device includes a verifying unit operable to verify that the specific one of the first number of communication specification information portions has been correctly received by the secondary device.

26. The system according to claim 21, wherein:
said secondary connector is detached from the first plurality of secondary devices prior to initiating the wireless communication between said first primary device and particular one of the first plurality of secondary devices or a particular one of the first portion of the first plurality of secondary devices.

27. The system according to claim 21, wherein said sending unit of said first primary device is operable to send a first random number to a particular one of the first plurality of secondary devices via said corresponding secondary connection; and
said first primary device includes:
a receiving unit operable to receive a second random number from that secondary device, and
a verifying unit operable to verify that the first random number is identical to the second random number.

28. The system according to claim 15, wherein said associating unit of said second primary device is further operable to associate a specific one of the communication specification information portions stored at the second primary device with each one of the second portion of the first plurality of secondary devices when the sum of the number of devices in the second plurality of secondary devices and the number of devices in second portion of the first plurality of secondary devices does not exceed the second number.

29. A computer-readable recording medium recorded with a program for carrying out a method of exchanging information between devices to permit subsequent wireless communication between the devices, said method comprising:
establishing a primary electrical connection between a first primary device and a second primary device;
generating a first number of communication specification information portions at the first primary device and a second number of communication specification information portions at the second primary device, each of the first number of communication specification information portions including information that is to be included in subsequent wireless communication between the first primary device and a given secondary device, each of the second number of communication specification information portions including information that is to be included in subsequent wireless communication between the second primary device and another given secondary device;
associating a specific one of the first number of communication specification information portions with each one of a first plurality of secondary devices when the number of devices in the first plurality of secondary devices does not exceed the first number, the first primary device thereby being operable to carry out wireless communication with each one of the first plurality of secondary devices;
associating a specific one of the first number of communication specification information portions with each one of a first portion of the first plurality of secondary devices when the number of devices in the first plurality of secondary devices exceeds the first number, the first primary device thereby being operable to carry out wireless communication with each one of the first portion of the first plurality of secondary devices;
associating a specific one of the second number of communication specification information portions with each one of a second plurality of secondary devices when the number of devices in the second plurality of secondary devices does not exceed the second number, the second primary device thereby being operable to carry out wireless communication with each one of the second plurality of secondary devices;
sending, from the first primary device via the primary electrical connection when the number of devices in the first plurality of secondary devices exceeds the first number, an inquiry as to whether any of the second number of communication specification information portions is not associated with one of the second plurality of secondary devices; and
associating a further specific one of the second number of communication specification information portions with at least one of a second portion of the first plurality of secondary devices when that communication specification information portion is not associated with one of the second plurality of secondary devices, the second primary device thereby being further operable to carry out wireless communication with the at least one of the second portion of the first plurality of secondary devices.

30. The computer-readable recording medium according to claim 29, wherein each of the first number of communication specification information portions includes identification information identifying a characteristic of the first primary device, and each of the second number of communication specification information portions includes identification information identifying a characteristic of the second primary device.

31. The computer-readable recording medium according to claim 29, wherein each of the first number of communication specification information portions and each of the second number of communication specification information portions includes an associated predetermined password.

32. The computer-readable recording medium according to claim 31, wherein the predetermined password includes a random number.

33. The computer-readable recording medium according to claim 29, wherein each of the first number of communication specification information portions includes information indicating a communication frequency to be used during the subsequent wireless communication between the first primary device and the given secondary device, and each of the second number of communication specification information portions includes information indicating a communication frequency to be used during the subsequent wireless communication between the second primary device and the another given secondary device.

34. The computer-readable recording medium according to claim 29, wherein each of the first number of communication specification information portions includes information indicating a wireless channel to be used during the wireless communication between the first primary device and the given secondary device, and each of the second number of communication specification information portions includes information indicating a wireless channel to be used during the wireless communication between the second primary device and the another given secondary device.

35. The computer-readable recording medium according to claim 29, further comprising:
establishing a plurality of successive secondary electrical connections, one at a time, between the first primary device and each one of the first plurality of secondary devices when the number of devices in the first plurality of secondary devices does not exceed the first number;

establishing a plurality of successive secondary electrical connections, one at a time, between the first primary device and each one of the first portion of the first plurality of secondary devices when the number of devices in the first plurality of secondary devices exceeds the first number; and said associating step includes sending, from the first primary device to each one of the first plurality of secondary devices or to each one of the first portion of the first plurality of secondary devices via its corresponding secondary electrical connection, the specific one of the first number of communication specification information portions.

36. The computer-readable recording medium according to claim 29, wherein said establishing step includes:
providing a relay station,
establishing determining whether a first electrical connection between the first primary device and the relay station, and
establishing a second electrical connection between the second primary device and the relay station; and
said sending step includes sending, the inquiry from the first primary device to the second primary device via the first electrical connection, the relay station, and the second electrical connection or to the relay station via the first electrical connection.

37. The computer-readable recording medium according to claim 36, wherein said step of associating a further specific one of the second number of communication specification information portions with at least one of a second portion of the first plurality of secondary devices includes:
receiving, at the first primary device, the further specific one of the second number of communication specification information portions from the second primary device or from the relay station;
sending the further specific one of the second number of communication specification information portions from the first primary device to the at least one of the second portion of the first plurality of secondary devices via a secondary electrical connection; and
notifying the second primary device that the further specific one of the second number of communication specification information portions has been associated with the at least one of the second portion of the first plurality of secondary devices.

38. The computer-readable recording medium according to claim 36, wherein said method further comprises:
storing the communication specification information portion associated with the at least one of the second portion of the first plurality of secondary devices in the relay station.

39. The computer-readable recording medium according to claim 35, wherein said method further comprises:
verifying, at the first primary device, that the specific one of the first number of communication specification information portions has been correctly received by that secondary device.

40. The computer-readable recording medium according to claim 35, wherein said method further comprises:
removing the secondary electrical connection prior to initiating the wireless communication between the first primary device and a particular one of the first plurality of secondary devices or a particular one of the first portion of the first plurality of secondary devices.

41. The computer-readable recording medium according to claim 35, wherein said method further comprises:
sending a first random number from the first primary device to a particular one of the first plurality of secondary devices via the corresponding secondary connection;
receiving, at the first primary device, a second random number from the particular one of the first plurality of secondary devices; and
verifying, at the first primary device, that the first random number is identical to the second random number.

42. The computer-readable recording medium according to claim 29, wherein said step of associating the specific one of the communication specification information portions stored at the second primary device with the at least one of a second portion of the first plurality of secondary devices includes:
associating a specific one of the communication specification information portions stored at the second primary device with each one of the second portion of the first plurality of secondary devices when the sum of the number of devices in the second plurality of secondary devices and the number of devices in second portion of the first plurality of secondary devices does not exceed the second number.

43. A method of exchanging information between devices to permit subsequent wireless communication between the devices, said method comprising:
providing a relay station,
establishing a first electrical connection between a first primary device and the relay station, and
establishing a second electrical connection between a second primary device and the relay station;
generating a first number of communication specification information portions at the first primary device and a second number of communication specification information portions at the second primary device, each of the first number of communication specification information portions including information that is to be included in subsequent wireless communication between the first primary device and a given secondary device, each of the second number of communication specification information portions including information that is to be included in subsequent wireless communication between the second primary device and another given secondary device;
storing each of the first number of communication specification information portions and each of second number of communication specification information portions at the relay station;
associating a specific one of the first number of communication specification information portions with each one of a first plurality of secondary devices when the number of devices in the first plurality of secondary devices does not exceed the first number, the first primary device thereby being operable to carry out wireless communication with each one of the first plurality of secondary devices;
associating a specific one of the first number of communication specification information portions with each one of a first portion of the first plurality of secondary devices when the number of devices in the first plurality of secondary devices exceeds the first number, the first primary device thereby being operable to carry out wireless communication with each one of the first portion of the first plurality of secondary devices;

associating a specific one of the second number of communication specification information portions with each one of a second plurality of secondary devices when the number of devices in the second plurality of secondary devices does not exceed the second number, the second primary device thereby being operable to carry out wireless communication with each one of the second plurality of secondary devices;

sending, from the first primary device to the relay station via the first electrical connection when the number of devices in the first plurality of secondary devices exceeds the first number, an inquiry as to whether any of the second number of communication specification information portions is not associated with one of the second plurality of secondary devices; and associating a further specific one of the second number of communication specification information portions with at least one of a second portion of the first plurality of secondary devices when that communication specification information portion is not associated with one of the second plurality of secondary devices, the second primary device thereby being further operable to carry out wireless communication with the at least one of the second portion of the first plurality of secondary devices.

44. The method according to claim 43, wherein said step of associating a further specific one of the second number of communication specification information portions with at least one of a second portion of the first plurality of secondary devices includes:

storing the further specific one of the second number of communication specification information portions in the relay station;

receiving, at the first primary device, the further specific one of the second number of communication specification information portions from the relay station;

sending the further specific one of the second number of communication specification information portions from the first primary device to the at least one of the second portion of the first plurality of secondary devices via a secondary electrical connection; and notifying the relay station that the further specific one of the second number of communication specification information portions has been associated with the at least one of the second portion of the first plurality of secondary devices.

45. A system for exchanging information between devices to permit subsequent performance of wireless communication between the devices, the system comprising:

a first primary device;

a second primary device; and a relay station having a first relay station connector coupled to said first primary device to form a first electrical connection between said first primary device and said relay station, and having a second relay station connector coupled to said second primary device to form a second electrical connection between said second primary device and said relay station;

said first primary device including:

a generating unit operable to generate a first number of communication specification information portions each including information that is to be included in subsequent wireless communication between said first primary device and a given secondary device, and an associating unit operable to associate a specific one of the first number of communication specification information portions with each one of a first plurality of secondary devices when the number of devices in the first plurality of secondary devices does not exceed the first number, the first primary device thereby being operable to carry out wireless communication with each one of the first plurality of secondary devices and to associate a specific one of the first number of communication specification information portions with each one of a first portion of the first plurality of secondary devices when the number of devices in the first plurality of secondary devices exceeds the first number, the first primary device thereby being operable to carry out wireless communication with each one of the first portion of the first plurality of secondary devices;

said second primary device including:

a generating unit operable to generate a second number of communication specification information portions, each of the second number of communication specification information portions including information that is to be included in subsequent wireless communication between the second primary device and another given secondary device, and an associating unit operable to associate a specific one of the second number of communication specification information portions with each one of a second plurality of secondary devices when the number of devices in the second plurality of secondary devices does not exceed the second number, the second primary device thereby being operable to carry out wireless communication with each one of the second plurality of secondary devices;

said relay station including:

a buffer operable to store each of the first number of communication specification information portions and each of second number of communication specification information portions;

said first primary device further including:

a sending unit operable to send an inquiry as to whether any of the second number of communication specification information portions is not associated with one of the second plurality of secondary devices to said relay station when the number of devices in the first plurality of secondary devices exceeds the first number; and said associating unit of said second primary device being further operable to associate a further specific one of the second number of communication specification information portions with at least one of a second portion of the first plurality of secondary devices when that communication specification information portion is not associated with one of the second plurality of secondary devices, the second primary device thereby being further operable to carry out wireless communication with the at least one of the second portion of the first plurality of secondary devices.

46. The system according to claim 45, wherein said relay station is further operable to store the further specific one of the second number of communication specification information portions, said first primary device includes a receiving unit operable to receive the communication further specific one of the second number of communication specification information portions from said relay station, and said sending unit of said first primary device is further operable to send the further specific one of the second number of communication specification information portions to at least one of the second portion of the first plurality of secondary devices via a secondary electrical connection and to notify said relay station that the further specific one of the second number of communication specification information portions has been associated with the at least one of the second portion of the first plurality of secondary devices.

47. A computer-readable recording medium recorded with a program for carrying out a method of exchanging information between devices to permit subsequent wireless communication between the devices, said method comprising:

providing a relay station, establishing a first electrical connection between a first primary device and the relay station, and establishing a second electrical connection between a second primary device and the relay station;

generating a first number of communication specification information portions at the first primary device and a second number of communication specification information portions at the second primary device, each of the first number of communication specification information portions including information that is to be included in subsequent wireless communication between the first primary device and a given secondary device, each of the second number of communication specification information portions including information that is to be included in subsequent wireless communication between the second primary device and another given secondary device;

storing each of the first number of communication specification information portions and each of second number of communication specification information portions at the relay station;

associating a specific one of the first number of communication specification information portions with each one of a first plurality of secondary devices when the number of devices in the first plurality of secondary devices does not exceed the first number, the first primary device thereby being operable to carry out wireless communication with each one of the first plurality of secondary devices;

associating a specific one of the first number of communication specification information portions with each one of a first portion of the first plurality of secondary devices when the number of devices in the first plurality of secondary devices exceeds the first number, the first primary device thereby being operable to carry out wireless communication with each one of the first portion of the first plurality of secondary devices;

associating a specific one of the second number of communication specification information portions with each one of a second plurality of secondary devices when the number of devices in the second plurality of secondary devices does not exceed the second number, the second primary device thereby being operable to carry out wireless communication with each one of the second plurality of secondary devices;

sending, from the first primary device to the relay station via the first electrical connection when the number of devices in the first plurality of secondary devices exceeds the first number, an inquiry as to whether any of the second number of communication specification information portions is not associated with one of the second plurality of secondary devices; and associating a further specific one of the second number of communication specification information portions with at least one of a second portion of the first plurality of secondary devices when that communication specification information portion is not associated with one of the second plurality of secondary devices, the second primary device thereby being further operable to carry out wireless communication with the at least one of the second portion of the first plurality of secondary devices.

48. The computer-readable recording medium according to claim 47, wherein said step of associating a further specific one of the second number of communication specification information portions with at least one of a second portion of the first plurality of secondary devices includes:

storing the further specific one of the second number of communication specification information portions in the relay station;

receiving, at the first primary device, the further specific one of the second number of communication specification information portions from the relay station;

sending the further specific one of the second number of communication specification information portions from the first primary device to the at least one of the second portion of the first plurality of secondary devices via a secondary electrical connection; and notifying the relay station that the further specific one of the second number of communication specification information portions has been associated with the at least one of the second portion of the first plurality of secondary devices.

* * * * *

UNITED STATES PATENT AND TRADEMARK OFFICE
CERTIFICATE OF CORRECTION

PATENT NO.         : 7,092,670 B2                                               Page 1 of 1
APPLICATION NO. : 10/056849
DATED              : August 15, 2006
INVENTOR(S)        : Makoto Tanaka, Toru Akazawa and Rajesh Kumar Dixit It is certified that error appears in the above-identified patent and that said Letters Patent is hereby corrected as shown below:

Column 4, line 5, "immediate" should read --immediately--.

Column 27, line 4, after "screen)", insert --.--.

Column 30, line 57, "includes" should read --include--.

Column 32, line 45, after "in", insert --the--.

Column 32, line 61, after "and", insert --a--.

Column 33, lines 33-34, after "devices", delete "said primary connection unit".

Column 33, line 58, "includes" should read --include--.

Column 34, line 32, "portion" should read --portions--.

Column 35, line 9, after "and", insert --a--.

Column 36, line 36, "includes" should read --include--.

Column 37, line 20, after "establishing", delete "determining whether".

Column 37, line 25, after "sending", delete ",".

Column 40, line 35, after "of", insert --the--.

Column 41, line 28, after "of", insert --the--.

Signed and Sealed this

Second Day of October, 2007

JON W. DUDAS
*Director of the United States Patent and Trademark Office*